(12) United States Patent
Lee et al.

(10) Patent No.: US 12,499,072 B2
(45) Date of Patent: Dec. 16, 2025

(54) MEMORY MODULE, SYSTEM INCLUDING THE SAME, AND OPERATION METHOD OF MEMORY MODULE

(71) Applicant: Samsung Electronics Co., Ltd., Suwon-si (KR)

(72) Inventors: Jonggeon Lee, Seoul (KR); Jinin So, Hwaseong-si (KR); Yongsuk Kwon, Goyang-si (KR); Kyungsoo Kim, Seoul (KR); Ilkwon Yun, Hwaseong-si (KR); Jeonghyeon Cho, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 381 days.

(21) Appl. No.: 17/715,158

(22) Filed: Apr. 7, 2022

(65) Prior Publication Data
US 2023/0028071 A1    Jan. 26, 2023

(30) Foreign Application Priority Data
Jul. 23, 2021 (KR) .......................... 10-2021-0096985

(51) Int. Cl.
| G06F 30/331 | (2020.01) |
| G06F 9/30 | (2018.01) |
| G06F 9/50 | (2006.01) |
| G06F 13/16 | (2006.01) |
| G06F 13/40 | (2006.01) |

(52) U.S. Cl.
CPC ...... *G06F 13/4081* (2013.01); *G06F 9/30189* (2013.01); *G06F 13/1668* (2013.01); *G06F 13/409* (2013.01)

(58) Field of Classification Search
None
See application file for complete search history.

(56) References Cited

U.S. PATENT DOCUMENTS 5,914,727 A * 6/1999 Horan ................. H04N 19/61
                                                    345/565
6,026,230 A * 2/2000 Lin ....................... G06F 30/33
                                                    703/13
(Continued)

FOREIGN PATENT DOCUMENTS

| KR | 1020110050457 A | 5/2011 |
| KR | 102217002 B1 | 2/2021 |

OTHER PUBLICATIONS

"What is the difference between DDR5, DDR4, DDR3. DDR2, DD$ and SDRAM?", Circa 2002, Micron (Year: 2002).*
(Continued)

*Primary Examiner* — Hyun Nam
(74) *Attorney, Agent, or Firm* — Muir Patent Law, PLLC

(57) ABSTRACT

A memory module includes a device memory configured to store data and including a first memory area and a second memory area, and a controller including an accelerator circuit. The controller is configured to control the device memory, transmit a command to exclude the first memory area from the system memory map to a host processor in response to a mode change request, and modify a memory configuration register to exclude the first memory area from the memory configuration register. The accelerator circuit is configured to use the first memory area to perform an acceleration operation.

19 Claims, 24 Drawing Sheets

(56) References Cited

U.S. PATENT DOCUMENTS

| | | | |
|---|---|---|---|
| 8,904,055 B2 | 12/2014 | Sato | |
| 10,013,212 B2 | 7/2018 | Zheng et al. | |
| 10,877,693 B2 | 12/2020 | Bonen et al. | |
| 12,376,730 B1* | 8/2025 | Huang | G06T 5/60 |
| 2003/0014468 A1* | 1/2003 | Sudhakaran | G06F 9/52 |
| | | | 718/104 |
| 2003/0233515 A1* | 12/2003 | Honig | G06F 16/90339 |
| | | | 711/216 |
| 2006/0095722 A1* | 5/2006 | Biles | G06F 8/4441 |
| | | | 712/34 |
| 2008/0263285 A1* | 10/2008 | Sharma | G06F 9/3897 |
| | | | 711/147 |
| 2011/0307233 A1* | 12/2011 | Tseng | G06F 30/347 |
| | | | 703/21 |
| 2017/0123987 A1* | 5/2017 | Cheng | G06F 15/7821 |
| 2018/0024957 A1 | 1/2018 | Nachimuthu et al. | |
| 2019/0146943 A1* | 5/2019 | Fender | G06F 30/34 |
| | | | 710/105 |
| 2020/0125503 A1 | 4/2020 | Graniello et al. | |
| 2020/0192798 A1 | 6/2020 | Natu | |
| 2020/0334178 A1* | 10/2020 | Li | G06F 9/5044 |
| 2021/0011864 A1* | 1/2021 | Guim Bernat | G06F 12/0833 |
| 2021/0117244 A1 | 4/2021 | Herdrich et al. | |
| 2022/0283847 A1* | 9/2022 | Persson | G06F 12/10 |
| 2024/0161831 A1* | 5/2024 | Jung | G11C 16/3459 |

OTHER PUBLICATIONS

"User- and Kernel Mode, System Calls, I/O, Exceptions", Feb. 2012, www.minnie.tubs.org (Year: 2012).*
"Memory Hotplug", Oct. 11, 2007, www.kernel.org (Year: 2007).*
Compute Express Link CXL Specification, revision 2.0, version 1.0, Oct. 26, 2020.
European Search Report issued Dec. 21, 2022 by the European Patent Office for corresponding patent application EP 22181336.3.
Examination Report dated Apr. 16, 2024 for corresponding application No. EP 22181336.3.

* cited by examiner

MEMORY MODULE, SYSTEM INCLUDING THE SAME, AND OPERATION METHOD OF MEMORY MODULE

CROSS TO REFERENCE TO RELATED APPLICATION(S)

This application claims benefit of priority under 35 U.S.C § 119 to Korean Patent Application No. 10-2021-0096985 filed on Jul. 23, 2021 in the Korean Intellectual Property Office, the disclosure of which is incorporated herein by reference in its entirety.

BACKGROUND

Example embodiments of the present disclosure relate to a memory module and a system including the same.

Recently, as artificial intelligence and big data have increasingly been used in various fields, amounts of data to be processed has greatly increased. To overcome the physical limitation of memory capacity of a computing system, various techniques have been developed. Among such techniques is COMPUTE EXPRESS LINK (CXL), an interface to more efficiently utilize an accelerator, a memory, and a storage device used together with a CPU in a high-performance computing system. An accelerator is a hardware module (e.g., a processor) specialized to execute a particular function. Specialization allows for increased performance and energy efficiency.

SUMMARY

An example embodiment of the present disclosure is to provide a memory module which may variably change a portion of a memory area, used exclusively for a system memory, to be used exclusively for an acceleration operation.

In an example embodiment of the present disclosure, a memory module includes a device memory configured to store data and including a first memory area and a second memory area; and a controller including an accelerator circuit, wherein the controller is configured to control the device memory, transmit a command to exclude the first memory area from a system memory map to a host processor in response to a mode change request, and modify a memory configuration register to exclude the first memory area from the memory configuration register, and wherein the accelerator circuit is configured to use the first memory area to perform an acceleration operation.

In an example embodiment of the present disclosure, a system includes a first memory; a controller configured to directly communicate with the first memory; a second memory; and a processor configured to directly communicate with the second memory and communicate with the controller through a heterogeneous computing interface, wherein the processor is configured to exclude a first memory area of the first memory from a system memory map, wherein the controller is configured to exclude the first memory area from a memory configuration register, and wherein the first memory area is changed from being used for a system memory to be used exclusively for an acceleration operation.

In an example embodiment of the present disclosure, a method of operating a memory module includes receiving, by a controller, a first mode change request for setting a first memory area of a device memory to be used exclusively for an accelerated operation; identifying, by the controller, the device memory and transmitting a command to exclude the first memory area from a system memory map, in response to the first mode change request; and modifying, by the controller, a memory configuration register to exclude the first memory area from the memory configuration register.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure will be described as follows with reference to the accompanying drawings.

Figure 1:
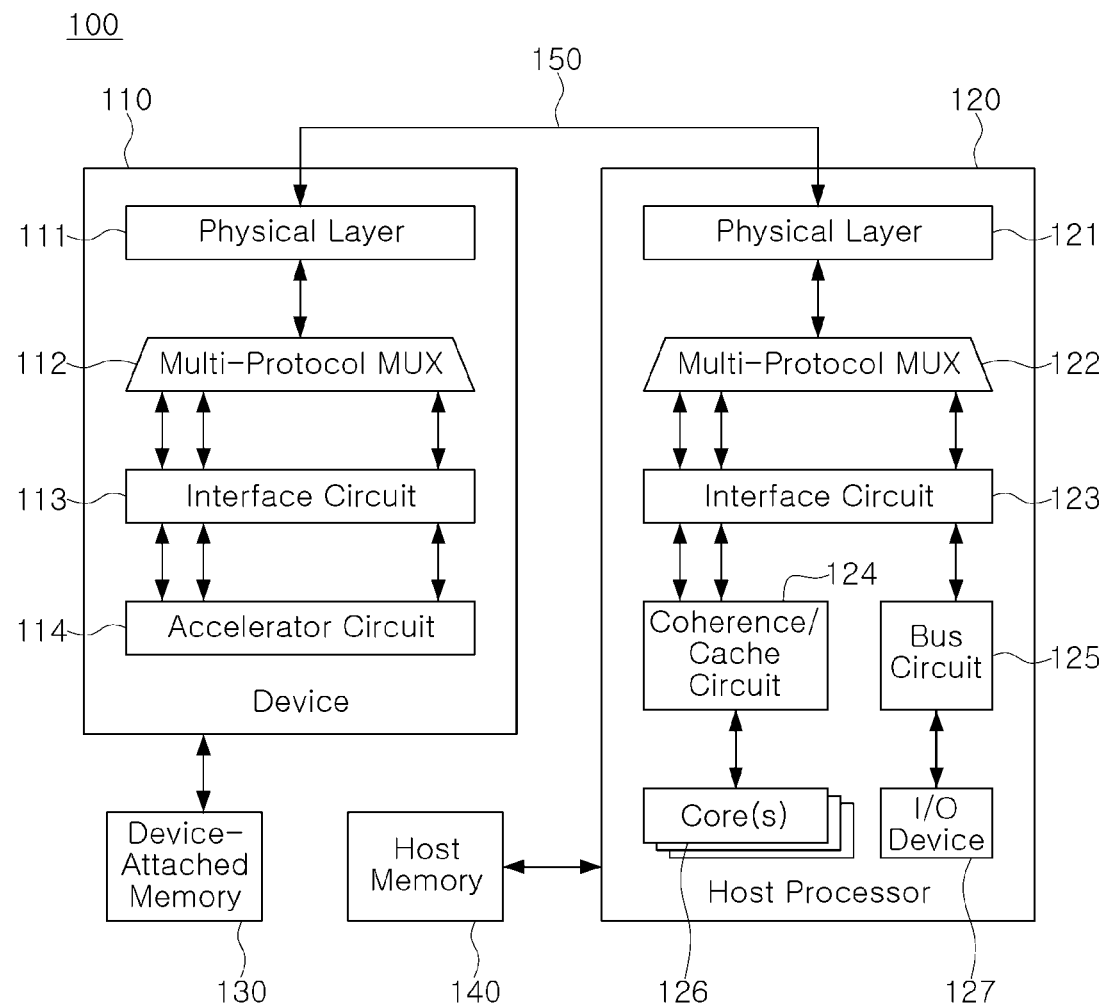
FIG. 1 is a block diagram illustrating a system according to an example embodiment of the present disclosure.

FIG. 1 is a block diagram illustrating a system according to an example embodiment.

Referring to FIG. 1, a system 100 may be configured as a computing system (or a component included in a computing system) including a device 110 and a host processor 120 communicating with each other. For example, the system 100 may be included in a stationary computing system, such as a desktop computer, a server, a kiosk, or the like, or may be included in a portable computing system, such as a laptop computer, a mobile phone, a wearable device, or the like. Also, in example embodiments, the system 100 may be included in a system-on-chip (SoC) or a system-in-package (SiP) in which the device 110 and the host processor 120 are implemented in a chip or a package. As illustrated in FIG. 1, the system 100 may include the device 110, the host processor 120, the device-attached memory 130, and the host memory 140. In example embodiments, the system 100 may not include the device-attached memory 130. Referring to FIG. 1, the device 110 and the host processor 120 may communicate with each other via a link 150, and may mutually transmit or receive messages and/or data over the link 150.

The example embodiments will be described with reference to the link 150 based on the COMPUTE EXPRESS LINK (CXL) specification supporting CXL protocols, but the device 110 and the host processor 120 may communicate with each other based on coherent interconnect technologies such as XBus protocol, NVLink protocol, infinity fabric protocol, cache coherent interconnect for accelerators (CCIX) protocol, coherent accelerator processor interface (CAPI), or the like.

In example embodiments, the link 150 may support multiple protocols, and messages and/or data may be transferred through the multiple protocols. For example, the link 150 may support CXL protocols including a non-coherent protocol (e.g., CXL.io), a coherent protocol (e.g., CXL.cache), and a memory access protocol (or a memory protocol such as CXL.mem). In example embodiments, the link 150 may support protocols such as peripheral component interconnect (PCI), PCI express (PCIe), universal serial bus (USB), serial advanced technology attachment (SATA), or the like. In the example embodiment, the protocol supported by the link 150 may be referred to as an interconnection protocol.

The device 110 may refer to a device providing a function to the host processor 120. In example embodiments, referring to the CXL specification 2.0, the device 110 may correspond to an accelerator or a memory buffer for a memory expander supporting the CXL specification.

When the device 110 operates as an accelerator, software executing on the host processor 120 may offload at least a portion of computing and/or input/output (I/O) operations to the device 110. In example embodiments, a device 110 operating as an accelerator may include a programmable component such as a graphic processing unit (GPU), a neural processing unit (NPU), a component providing a fixed function such as an intelligent property (IP) core, and a reconfigurable component such as a field programmable gate array (FPGA). As illustrated in FIG. 1, the device 110 may include a physical layer 111, a multi-protocol multiplexer 112, an interface circuit 113 and an accelerator circuit 114, and may communicate with the device-attached memory 130.

The accelerator circuit 114 may perform, within the device 110, functions provided to the host processor 120, and may be referred to as accelerator logic. When the device-attached memory 130 is included in system 100 as illustrated in FIG. 1, the accelerator circuit 114 may communicate with the device-attached memory 130 and may communicate with the device-attached memory 130 based on a protocol insubordinate of link 150, which is, a device-specific protocol. Also, as illustrated in FIG. 1, the accelerator circuit 114 may communicate with the host processor 120 through the interface circuit 113 using multiple protocols. The accelerator circuit 114 may comprise, for example, a coprocessor or an integrated circuit that may be used to supplement the functions of the host processor 120.

The interface circuit 113 may determine one of multiple protocols based on messages and/or data for communication between the accelerator circuit 114 and the host processor 120. The interface circuit 113 may be connected to at least one protocol queue included in the multi-protocol multiplexer 112, and may transmit messages and/or data to and may receive messages and/or data from the host processor 120 via the at least one protocol queue. In example embodiments, the interface circuit 113 and the multi-protocol multiplexer 112 may be integrated as a single component. In example embodiments, the multi-protocol multiplexer 112 may include multiple protocol queues corresponding to the multiple protocols supported by the link 150, respectively. Also, in example embodiments, the multi-protocol multiplexer 112 may arbitrate between communications by different protocols and may provide selected communications to the physical layer 111. In example embodiments, the physical layer 111 may be connected to the physical layer 121 of the host processor 120 through a single interconnect, a bus, a trace, or the like.

When the device 110 operates as a memory buffer, the host processor 120 may identify and connect the device 110, and may access a memory pool of the device 110. In example embodiments, the device memory 130 may be implemented as various types of memory, such as, for example, a storage class memory (SCM). The storage class memory may have characteristics of both a nonvolatile memory and a volatile memory, and may be accessed in units of bytes. For example, the storage class memory may include a phase-change RAM (PCM), a ferroelectric RAM (FeRAM), a magnetic RAM (MRAM), a resistive RAM (RRAM), an STT-MRAM, and the like.

The host processor 120 may be configured as a main processor of the system 100, such as, for example, a central processing unit (CPU), and may correspond to a host processor (or a host) of the CXL specification in example embodiments. As illustrated in FIG. 1, the host processor 120 may be connected to the host memory 140, and may include a physical layer 121, a multi-protocol multiplexer 122, an interface circuit 123, a coherence/cache circuit 124, a bus circuit 125, at least one core 126, and an input/output device 127.

At least one core 126 may execute an instruction and may be connected to the coherence/cache circuit 124. The coherence/cache circuit 124 may include a cache hierarchy and may be referred to as coherence/cache logic. As illustrated in FIG. 1, the coherence/cache circuit 124 may communicate with at least one core 126 and one interface circuit 123. For example, the coherence/cache circuit 124 may enable communication through two or more protocols including a coherent protocol and a memory access protocol. In example embodiments, the coherence/cache circuit 124 may include a direct memory access (DMA) circuit. The input/output device 127 may be used to communicate with the bus circuit 125. For example, the bus circuit 125 may be configured as a PCIe logic device, and the input/output device 127 may be configured as a PCIe input/output device.

The interface circuit 123 may enable communication between components of host processor 120, such as, for example, the coherence/cache circuit 124 and the bus circuit 125 and the device 110. In example embodiments, the interface circuit 123 may enable communication of messages and/or data between components of the host processor 120 and the device 110 in accordance with multiple protocols, such as a non-coherent protocol (CXL.io), a coherent protocol (CXL.cache), and a memory protocol (CXL.memory). For example, the interface circuit 123 may determine one of a multiple protocols based on messages and/or data for communications between the devices 110 and components of the host processor 120.

The multi-protocol multiplexer 122 may include at least one protocol queue. The interface circuit 123 may be connected to at least one protocol queue, and may transmit messages and/or data to and may receive messages and/or data from the device 110 through the at least one protocol queue. In example embodiments, the interface circuit 123 and the multi-protocol multiplexer 122 may be integrated with each other as a single component. In example embodiments, the multi-protocol multiplexer 122 may include multiple protocol queues corresponding to each of the multiple protocols supported by the link 150. Also, in example embodiments, the multi-protocol multiplexer 122 may mediate between communications by different protocols and may provide selected communications to the physical layer 121.

CXL may support dynamic multiplexing between non-coherent protocol (CXL.io), coherent protocol (CXL.cache) and memory protocol (CXL.memory). Non-coherent protocol (CXL.io) may be used for functions such as a non-coherent load store, device discovery using producer-consumer semantics, configuration, initialization, I/O virtualization, and direct memory access (DMA).

The coherent protocol (CXL.cache) may enable the device to cache data from the host memory using a simple request and response protocol. The host processor may manage coherency of data cached on the device using snoop messages.

The memory protocol (CXL.memory) may enable the host processor to access a shared device memory. Memory protocol (CXL.memory) transactions may be simple memory loads and may store transactions executed downstream from the host processor. CXL may maintain a coherent unified memory space between the host processor (CPU) and the memory attached to the CXL device, such that both the CPU and the device may share resources to increase performance and to reduce software stack complexity.

In an example embodiment, a portion of a memory area of a device operating as a memory buffer for memory expansion may be changed to be used as an area for storing data required for acceleration operation. An acceleration operation is a process performed by an accelerator in executing a specific function in a more efficient manner than a general-purpose processor, such as host processor 120. Data stored in the memory area may be moved to another memory area if desired. After moving the data, the memory area may be excluded from the system memory map, and information in a memory configuration register included in the device may be changed. Accordingly, a portion of the memory area used for the system memory may be changed to be used exclusively for the acceleration operation. Also, a memory area used exclusively for acceleration calculation may be changed to be used as a system memory area. When data is moved, existing data may be restored to the memory area. Accordingly, the use of the memory area of the device may be adaptively changed, thereby increasing efficiency of the system. An acceleration operation is a process performed by an accelerator in executing a specific function in a more efficient manner than a general-purpose processor, such as host processor 120. For example, an acceleration operation may include a cryptographic operation, a digital signal processing operation, a graphics processing operation, a data packet processing operation, an artificial intelligence (AI) related processing operation, etc.

Figure 2:
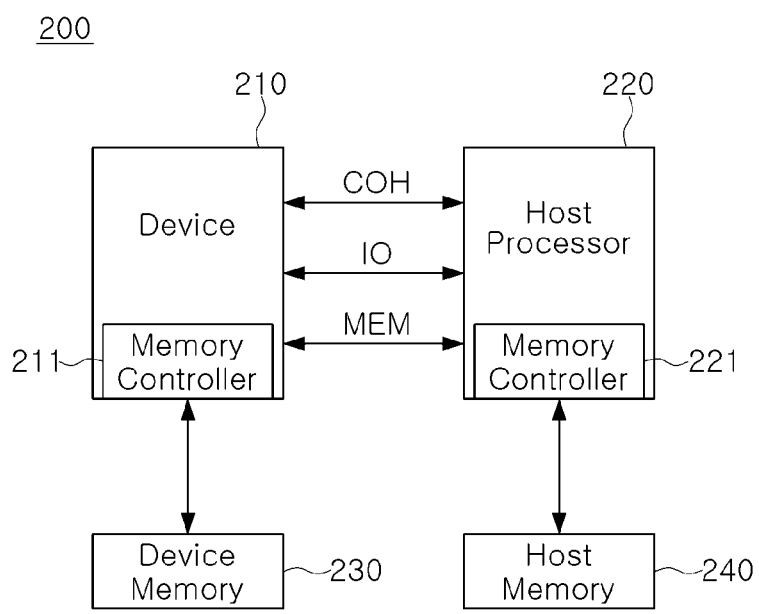
FIG. 2 is a block diagram illustrating a system according to an example embodiment of the present disclosure.

FIG. 2 is a block diagram illustrating a system according to an example embodiment.

Referring to FIG. 2, a system 200 may include a device 210, a host processor 220, a device memory 230, and a host memory 240. In example embodiments, device memory 230 may correspond to a device-attached memory 130 in FIG. 1.

As described in the aforementioned example embodiment with reference to FIG. 1, the device 210 and the host processor 220 may communicate with each other based on multiple protocols. The multiple protocols may include a memory protocol (MEM), a coherent protocol (COH), and a non-coherent protocol (IO). In example embodiments, referring to CXL specification 2.0, memory protocol (MEM), coherent protocol (COH) and non-coherent protocol (IO) may correspond to CXL.mem, CXL.cache and CXL.io, respectively. The non-coherent protocol (IO) may correspond to the PCIe transaction layer and may be used for device discovery, interrupt management, providing access to registers, and handling of signal errors of the system 200. The disclosure of the COMPUTE EXPRESS LINK CXL Specification, October 2020, Revision 2 is incorporated herein by reference in its entirety.

The memory protocol (MEM) may be used when the host processor 220 accesses a memory (e.g., the device-attached memory 130 in FIG. 1) of an accelerator (e.g., the accelerator circuit 114 in FIG. 1). The memory protocol (MEM) may define transactions between a master and a subordinate.

The master may refer to an agent triggering a request in the CXL.mem protocol. For example, as for a transaction for a MemRd command, the master may correspond to the host processor 220 triggering the MemRd command.

The subordinate may refer to an agent responsible for responding to a request triggered by the master in the CXL.mem protocol. For example, in the case of a transaction for a MemRd command, the subordinate may correspond to a memory device. The memory device may be the host memory 140 illustrated in FIG. 1 or the device-attached memory 130.

The memory protocol (MEM) may define a transaction from a master to a subordinate and a transaction from a subordinate to a master. For example, referring to CXL specification 2.0, a transaction from a master to a subordinate may be referred to as a master to subordinate (M2S) transaction, and a transaction from a subordinate to a master may be referred to as a subordinate to master (S2M) transaction.

In example embodiments, the device 210 may correspond to one of at least three types. When the device 210 is a partitioned global address space (PGAS) network interface card (NIC) or an atomic NIC, the device 210 may correspond to a first type (Type 1) defined in the CXL specification. The system 200 may not include the device memory 230. The multiple protocols in the system 200 including the first type of device 210 may only include a coherent protocol (COH) and a non-coherent protocol (10). When the device 210 corresponds to the first type, the device 210 may use the memory of the host processor 220 through a coherent protocol (COH). When the device 210 corresponds to the first type, the system 200 may support device to host (D2H) cache coherence and a host to device (H2D) snoop transaction.

When device 210 includes a memory and operates as an accelerator (when the device 210 may include the accelerator circuit 114 in FIG. 1), the device 210 may correspond to a second type (Type 2) defined in the CXL specification. The multiple protocols in the system 200 including the second type of device 210 may include a coherent protocol (COH), a non-coherent protocol (10), and a memory protocol (MEM). For example, the host processor 220 may discover the device 210 using a non-coherent protocol (10), and may access the device memory 230 corresponding to the discovered device 210 using the memory protocol (MEM), and may allow the device 210 to use the memory of the host processor 220 through a coherent protocol (COH).

When the device 210 operates as a device for a memory expander, the device 210 may correspond to a third type (Type 3) defined in the CXL specification. The multiple protocols in the system 200 including the third type of device 210 may include a memory protocol (MEM) and a non-coherent protocol (10). For example, the host processor 220 may identify and connect the device 210 via a non-coherent protocol (10) and may access a memory pool of the device 210 via a memory protocol (MEM). The device 210 may communicate with the device memory 230 and may include a memory controller 211 for accessing the device memory 230. In example embodiments, different from the example illustrated in FIG. 2, the memory controller 211 may be present externally of the device 210 and may be integrated with the device memory 230. Also, the host processor 220 may communicate with the host memory 240, and may include a memory controller 221 for accessing the host memory 240. In example embodiments, different from the example illustrated in FIG. 2, the memory controller 221 may be present externally of the host processor 220 and may be integrated with the host memory 240.

In example embodiments, the device memory 230 may be implemented as various types of memory, and as an example, the device memory 230 may be implemented as a storage class memory (SCM). The storage class memory may have characteristics of both nonvolatile and volatile memories, and may be accessed in units of bytes. For example, the storage class memory may include phase-change RAM (PCM), ferroelectric RAM (FeRAM), magnetic RAM (MRAM), resistive RAM (RRAM), STT-MRAM, and the like. The device 210 may operate as a device for memory bandwidth expansion or memory capacity expansion using the storage class memory.

In an example embodiment, the memory controller 211 of the third type of device 210 may include an accelerator circuit. Accordingly, the device 210 may not be used as a memory expander of the host memory, and may also be used for a portion of the memory area of the device memory 230 to perform an acceleration operation. The memory area dedicated to the acceleration operation may be excluded from the system memory map by hot-plugging out the memory area, and a portion of the memory area of the device memory 230 may be used exclusively for an acceleration operation by changing information in the memory configuration register included in the device 210. Also, after the acceleration operation is completed, the memory area used exclusively for the acceleration operation may be restored back to the system memory area.

Figure 3:
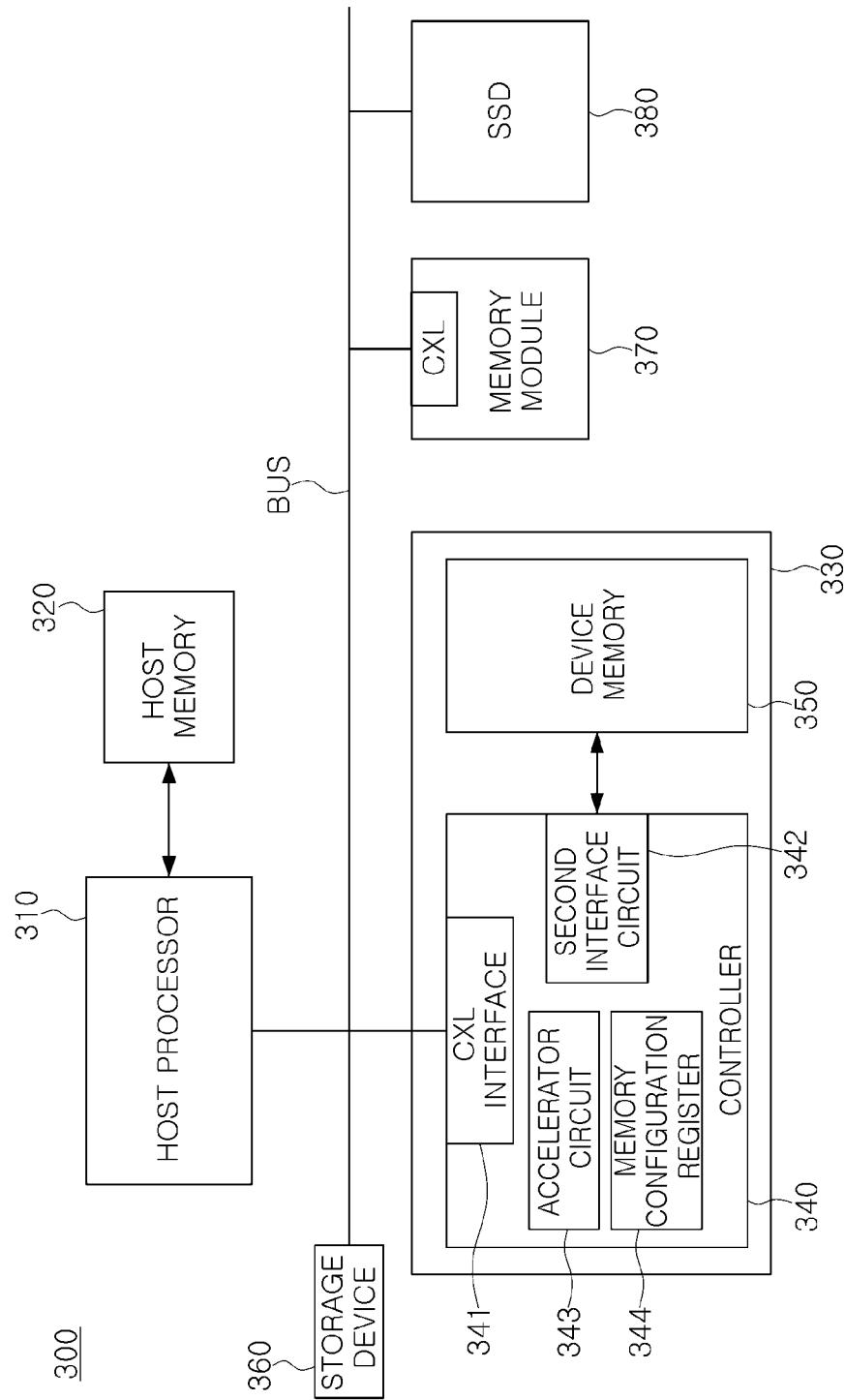
FIG. 3 is a block diagram illustrating a system according to an example embodiment of the present disclosure.

FIG. 3 is a block diagram illustrating a system according to an example embodiment.

Referring to FIG. 3, a system 300 may include a host processor 310, a host memory 320, and a memory module 330. In an example embodiment, the system 300 may be a heterogenous computing system. A heterogeneous computing system may be configured such that different types of computing devices may be organically connected to each other and may perform various functions. In a heterogenous computing system, more than one kind of processor or core may perform the various functions. System 300 is an example of a heterogenous computing system as it includes the host processor 310 and the controller 340 performing various functions as described below.

The host processor 310 may be a processor core configured to control overall operations of the system 300. For example, the host processor 310 may be configured to process data by interpreting commands of an operating system or various programs executing on the system 300. The host processor 310 may communicate with the host memory 320. Data processed by the host processor 310 or data required during the operation of the host processor 310 may be stored in the host memory 320. In an example embodiment, the host memory 320 may be a dual in-line memory module (DIMM)-based memory, and may communicate directly with the host processor 310. The host memory 320 may be used as a buffer memory, a cache memory, or a system memory for the host processor 310.

The memory module 330 may operate under control of the host processor 310. For example, the memory module 330 may communicate with the host processor 310 through a heterogeneous computing interface. A heterogenous computing interface enables coherent interconnect between a host processor (i.e., a general purpose processor), memory and an accelerator. In an example embodiment, the heterogeneous computing interface may include an interface based on a CXL protocol. It may be assumed that the heterogeneous computing interface may be an interface based on the CXL protocol, that is, the CXL interface, but an example embodiment thereof is not limited thereto. The heterogeneous computing interface may be implemented based on at least one of various computing interfaces, such as a Gen-Z protocol, an NVLink protocol, a cache coherent interconnect for accelerators (CCIX) protocol, and an open coherent accelerator processor interface (CAPI) protocol.

The memory module 330 may store data or may output stored data according to control of the host processor 310 through the CXL interface. That is, the host processor 310 may use the memory module 330 as a memory area having a function similar to that of the host memory 320. In an example embodiment, the memory module 330 may correspond to a third type (Type 3) memory device defined by the CXL standard.

The memory module 330 may include a controller 340 and a device memory 350. The device memory 350 may be a dual in-line memory module (DIMM) based memory and may communicate directly with the controller 340. The controller 340 may store data in the device memory 350 or may read data stored in the device memory 350. The controller 340 may include a first interface circuit 341 and a second interface circuit 342. The first interface circuit 341 may communicate with the host processor 310 and may exchange data according to a CXL protocol, for example, but an example embodiment thereof is not limited thereto. The second interface circuit 342 may communicate with the device memory 350 and may exchange data according to, for example, a DDR1, DDR2, DDR3, DDR4, DDR5, or DDR6 protocol, but an example embodiment thereof is not limited thereto. Also, the device memory 350 may be a flash memory.

The accelerator circuit 343 may be a processor core or operator configured to perform a particular operation. For example, the accelerator circuit 343 may be an operator or processor configured to perform artificial intelligence (AI) operations, such as a GPU, NPU, NPU, or the like. In an example embodiment, the accelerator circuit 343 may perform an arithmetic operation under control of the host processor 310.

In an example embodiment, the accelerator circuit 343 may be connected to the CXL interface 341. The accelerator circuit 343 may receive an operation command from the host processor 310 through the CXL interface 341, and may perform an arithmetic operation on data received from the storage device 360 in response to the received operation command. Data received from the storage device 360 may be stored in the device memory 350. The storage device 360 may store data required for an acceleration operation, and for example, the data may refer to a deep learning recommendation model (DLRM) table, but an example embodiment thereof is not limited thereto.

A memory configuration register 344 may include information about the memory structure of the device memory 350. As an example, the memory configuration register 344 may include information about memory areas. The information may include a plurality of paired memory addresses, wherein each of the plurality of paired memory addresses defines a memory area. For example, each memory area may be defined or identified by an upper memory address and a lower memory address. The information may also include a single address and a corresponding length or size that in combination identifies a memory area.

The host memory 320 and the device memory 350 may be configured as a system memory for storing a plurality of pieces of operational data or outputting the stored plurality of pieces of operational data under control of the host processor 310.

In example embodiments, the system 300 may further include one or more memory modules 370 and a NAND flash-based solid state drive (SSD). The one or more memory modules 370 may be memory modules communicating with the host processor 310 through a heterogeneous computing interface described above.

Each component 310, 330, 360, 370, and 380 may communicate with each other through a system bus (BUS).

In an example embodiment, the memory module 330 may be used as a memory expander for storing data or outputting stored data under the control of the host processor 310, or may perform an accelerated operation for data received from the storage device 360. The memory module 330 may variably change a portion of the memory area of the device memory 350 to be used as one of a system memory use and an accelerated operation use in response to the mode change request. The accelerator circuit may use the memory area to perform an acceleration operation.

Figure 4:
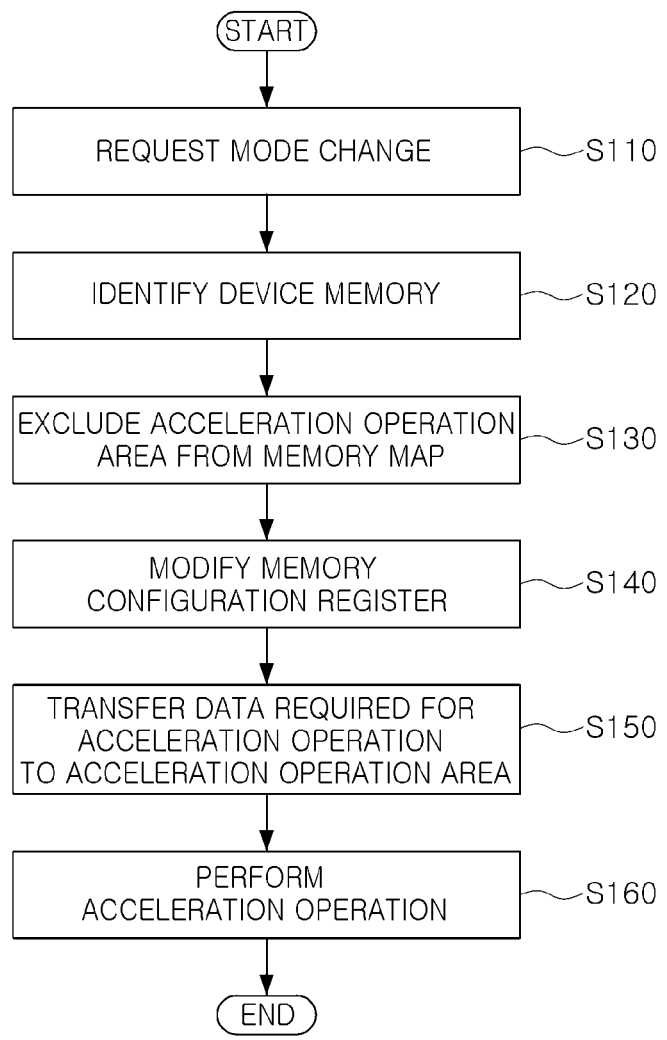
FIG. 4 is a flowchart illustrating a method of operating a system according to an example embodiment of the present disclosure.

FIG. 4 is a flowchart illustrating a method of operating a system according to an example embodiment.

Referring to FIGS. 3 and 4 together, an accelerator circuit 343 of a controller 340 may perform an acceleration operation on a task assigned from the host processor 310. At least a portion of the data stored in the storage device 360 may be used for an acceleration operation by the accelerator circuit 343. The operating system (OS) may control software or hardware resources of the system 300, and may control program execution by the host processor 310. The host processor 310 may execute an operating system (OS) and application programs. The host processor 310 operates in two modes, which are a user mode and a kernel mode. Applications are run in the user mode and functions requiring hardware resources of the system 300 are run in the kernel mode. An operating system (OS) and an application program may be stored in a storage unit, and the storage unit may be a nonvolatile storage device. The nonvolatile storage device may be a flash memory, but an example embodiment thereof is not limited thereto. When a system call or interrupt occurs from a task while the application program is executed, the operating system may recognize the system call or interrupt as an event in which the application program switches from a user mode to a kernel mode. For example, the application program may transmit a mode change request for setting a portion of the memory area of the device memory 350 to be used for an accelerated operation to the operating system using the system call interface, or may transmit mode switch request for restoring the memory area to be used for the system memory. The mode change request may refer to an event in which an application program switches from a user mode to a kernel mode. For example, the mode change request may be transmitted from the host processor 310 to the controller 340 of the memory module 330, or the operating system may transmit the mode change request to the controller 340 of the memory module 330. The controller 340 may receive the mode change request. The controller 340 may receive information indicating the quantity of data from the operating system. As an example, with respect to machine learning algorithms, the controller 340 may receive a batch size from the operating system, and the batch size may refer to the quantity of data belonging to a single group when an entire training data set is divided into a plurality of groups.

In response to the mode change request (S110), the controller 340 may identify the memory area of the device memory 350 (S120), and may transmit a command to exclude a memory area to be set as the acceleration operation area from the system memory map to the host processor 310 to set a portion of the memory area of the device memory 350 as an acceleration operation area. Accordingly, the memory area to be set as the acceleration operation area may be excluded from the system memory map (S130). Also, the controller 340 may exclude a memory area to be set as the acceleration operation area from the memory configuration register 344 by modifying the memory configuration register 344 (S140). The controller 340 may move the data required for the acceleration operation from the storage device 360 to the memory area set as the acceleration operation area (S150), and the accelerator circuit 343 may perform the acceleration operation using the data (S160). As an example, the data required for the acceleration operation may refer to a deep learning recommendation model (DLRM) table.

In an example embodiment, since the memory module 330 performs an acceleration operation and transmits only the calculated result value to the host processor 310, a bandwidth of the host processor 310 may be secured. Accordingly, efficiency of the system 300 may increase.

Figure 5A:
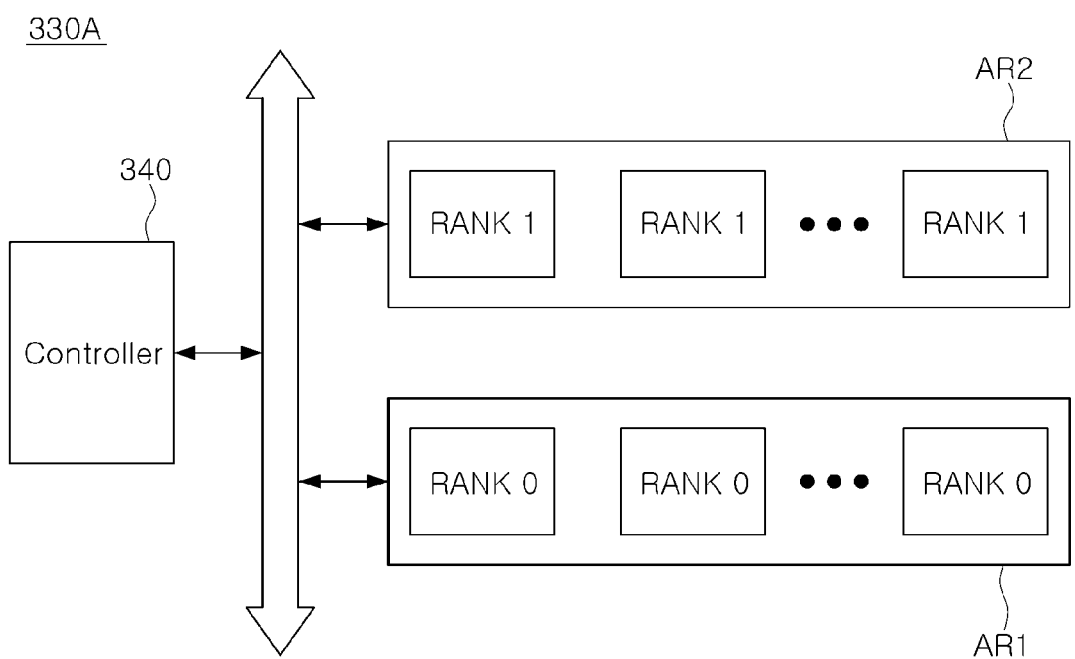
FIGS. 5A and 5B are diagrams illustrating a memory module according to an example embodiment of the present disclosure.
Figure 5B:
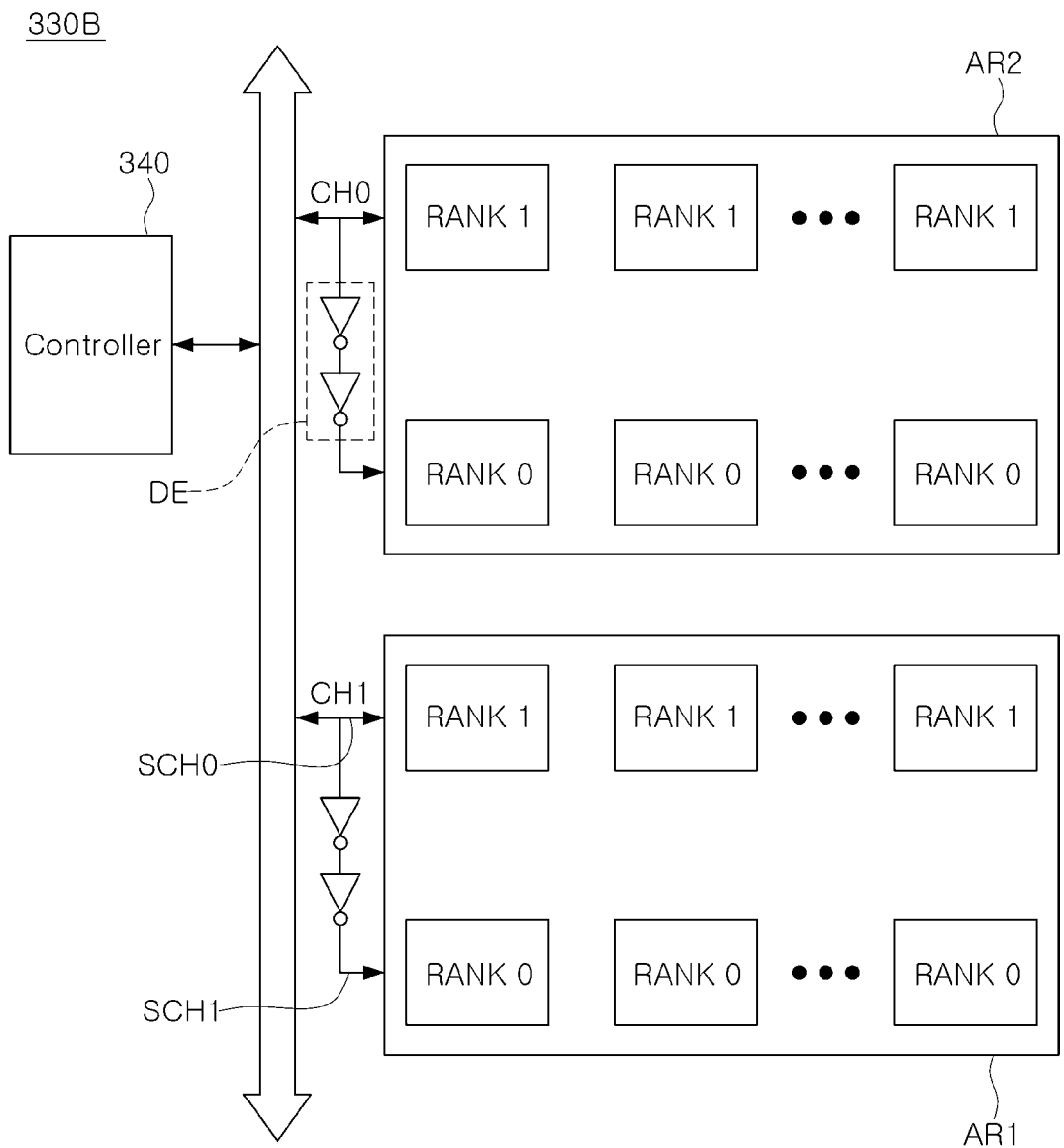

FIGS. 5A and 5B are diagrams illustrating a memory module according to an example embodiment. As illustrated in FIG. 5A, the memory module 330A may set or define the memory areas AR1 and AR2 dedicated to the acceleration operation in units of ranks RANK0 and RANK1. Also, as illustrated in FIG. 5B, the memory module 330B may set or define the memory areas AR1 and AR2 dedicated to the acceleration operation based on channel unit CH0 and CH1.

In example embodiments, each channel CH0 and CH1 may include a plurality of sub-channels SCH0 and SCH1. The sub-channels SCH0 and SCH1 may refer to insubordinate data paths present between the controller 340 and the device memory. At least one delay device DE may be disposed between the sub-channels SCH0 and SCH1. The delay device DE may be a device in which inverters may be connected in parallel. The memory areas AR1 and AR2 may be connected to the sub-channels SCH0 and SCH1. However, an example embodiment thereof is not limited thereto, and the memory modules 330A and 330B may set or define a memory area dedicated to the acceleration operation in units of sub-channels, a bank group, and a bank.

Figure 6:
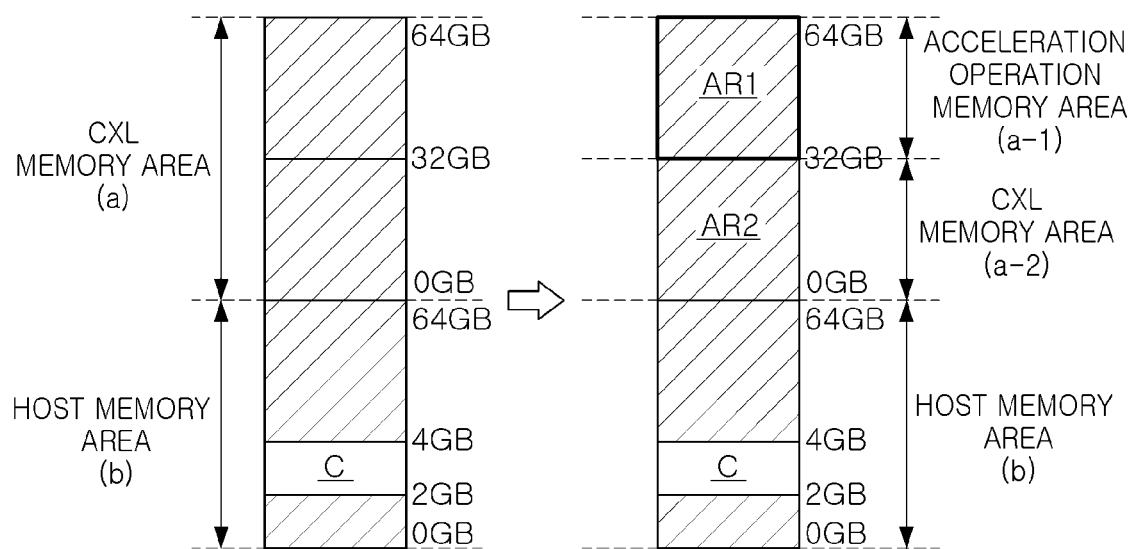
FIG. 6 is a diagram illustrating a system memory map according to an example embodiment of the present disclosure.

FIG. 6 is a diagram illustrating a system memory map according to an example embodiment.

Generally, when booting a computer, firmware may create a system memory map allocating a memory space for devices installed in the system. A hot-plug may refer to a function immediately recognized and used when a new device (e.g., PGAS NIC, an atomic NIC, an accelerator, and a memory expander) is connected during system operation. Accordingly, a memory space allocated to the hot-plugged device may be excluded from or included in the system memory map without a system reboot.

A hot-plug (hot-plugging) may refer to a function in a computing system to remove or add resources while the computing system is operating. For example, when a resource of a computing system is removed while the computing system is operating, the resource may be referred to as being hot-plugged out (off-lining), and when a resource of the computing system is added while the computing system is operating, the resource may be referred to as being hot-plugged in (on-lining). Hot plugging in/out of a resource may refer to the resource being logically coupled or removed from the computing system.

The resources of the computing system to be hot-plugged may vary. For example, at least a portion of the plurality of processors included in the computing system may be hot-plugged in/out, and at least a portion of the memory devices included in the computing system may be hot-plugged in/out, and at least a portion of the plurality of cores included in the multi-core processor may be hot-plugged in/out, or at least a portion of the memory areas of the memory device may be hot-plugged in/out.

The system memory map may include a device memory area (a), which may also be referred to as a CXL memory area, a host memory area (b), and a hole area (c) which may not be a memory area. The system memory map may include an upper memory address and a lower memory address for each area.

The host processor may exclude the memory area AR1 corresponding to the acceleration operation area from the system memory map using a hot-plug function. Accordingly, the device memory area (a) may be changed to the device memory area (a-2). By excluding the accelerated computation region AR1 from the memory map, access of the host processor to the accelerated computation region AR1 may be limited.

Figure 7:
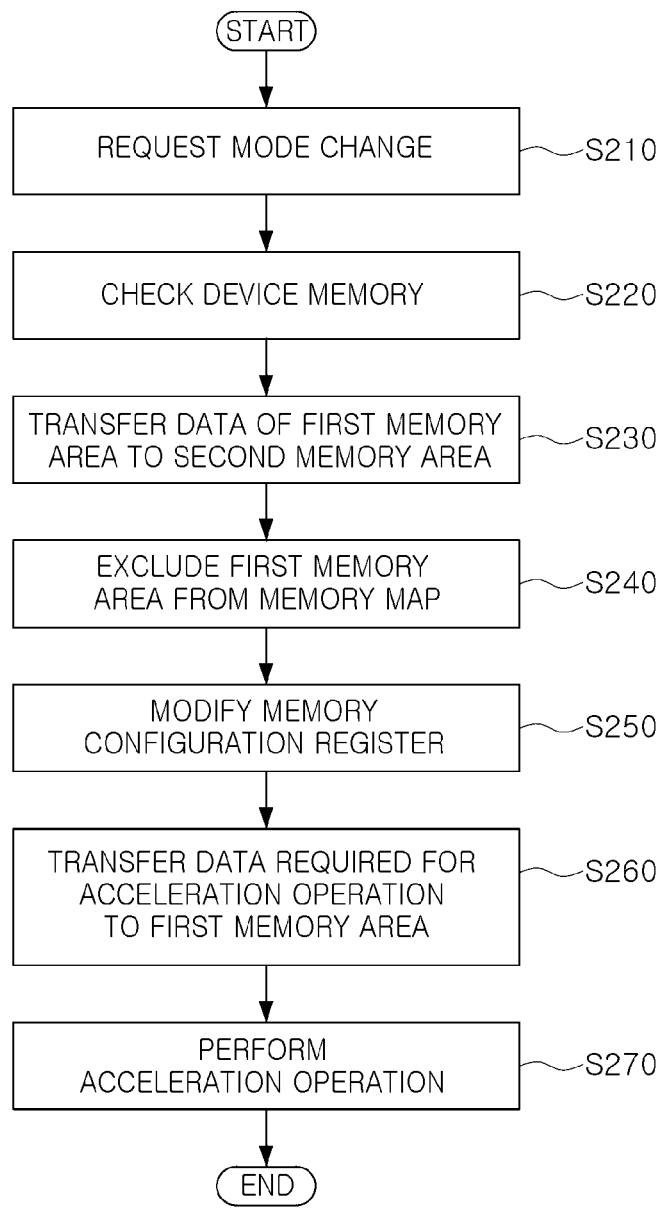
FIG. 7 is a flowchart illustrating a method of operating a system according to another example embodiment of the present disclosure.

FIG. 7 is a flowchart illustrating a method of operating a system according to another example embodiment.

Referring to FIGS. 3 and 7 together, the controller 340 may receive a mode change request for setting a portion of the memory area of the device memory 350 to be used for an accelerated operation. The controller 340 may receive information indicating the quantity of data from the operating system. The controller 340 may calculate memory capacity required to perform an acceleration operation based on the quantity of data received from the operating system.

In response to the mode change request (S210), the controller 340 may check the memory area of the device memory 350 (S220), and may set the first memory area AR1 of the device memory 350 as the acceleration operation area, data in the first memory area AR1 may be moved to a second memory area AR2 different from the first memory area AR1 (S230). The controller 340 may move the data distributed and stored in the first memory area AR1 to the second memory area AR2 to store the data required for the acceleration operation in a continuous position of the device memory 350. Accordingly, a continuous space for data required for acceleration calculation may be secured in the device memory 350.

The controller 340 may transmit a command to exclude the first memory area AR1 from the system memory map to the host processor 310. Accordingly, the first memory area AR1 may be excluded from the system memory map (S240). Also, the controller 340 may modify the memory configuration register 344 and may exclude the first memory area AR1 from the memory configuration register 344 (S250). The controller 340 may move the data required for the acceleration operation from the storage device 360 to the first memory area AR1 (S260), and the accelerator circuit 343 may perform the acceleration operation using the data (S270).

Figure 8:
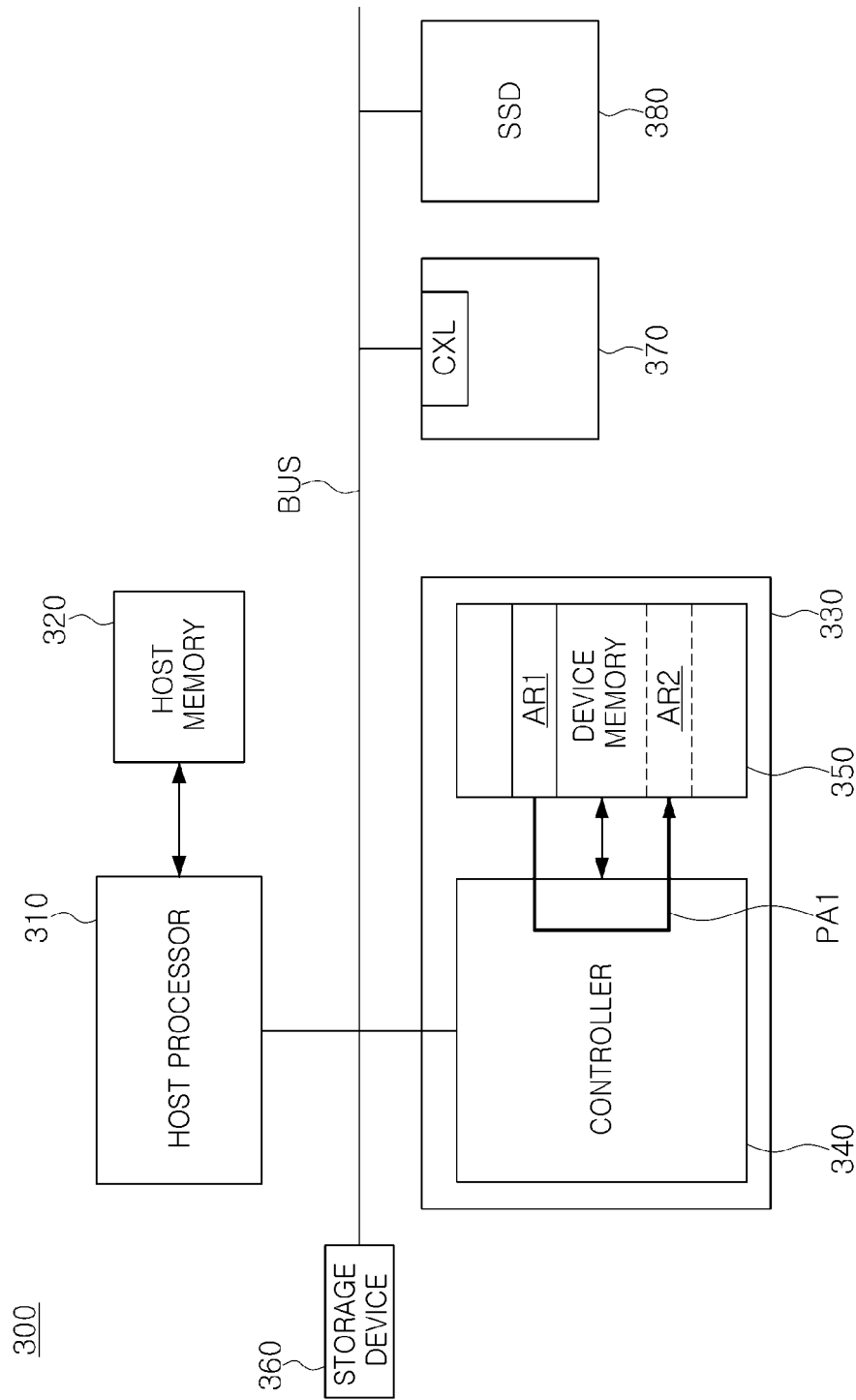
FIGS. 8 to 10 are diagrams illustrating a method of operating a system according to an example embodiment of the present disclosure.
Figure 9:
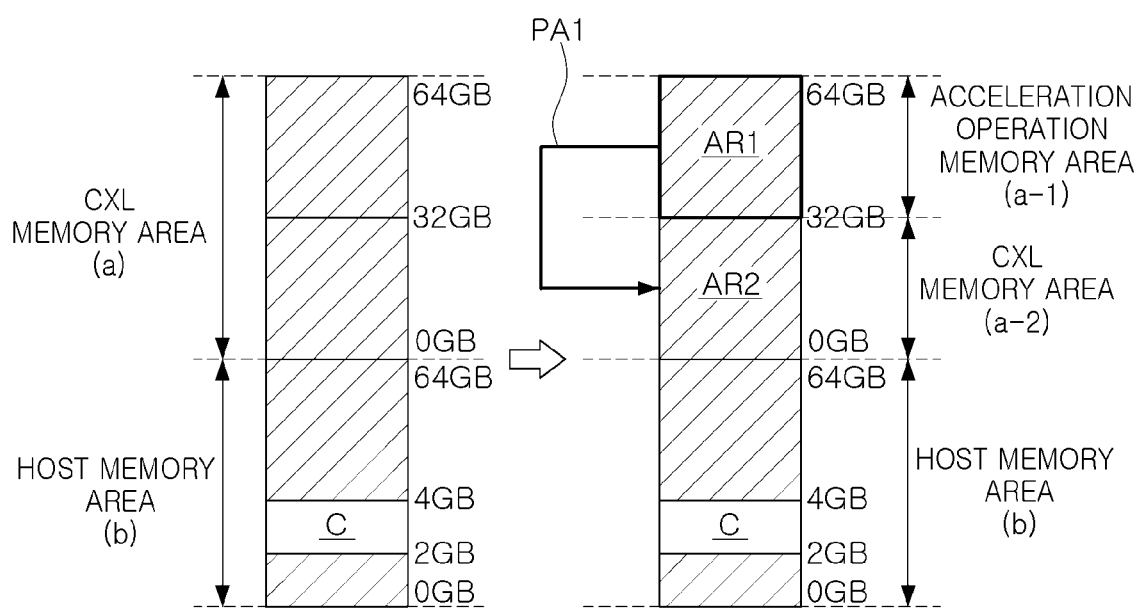
Figure 10:
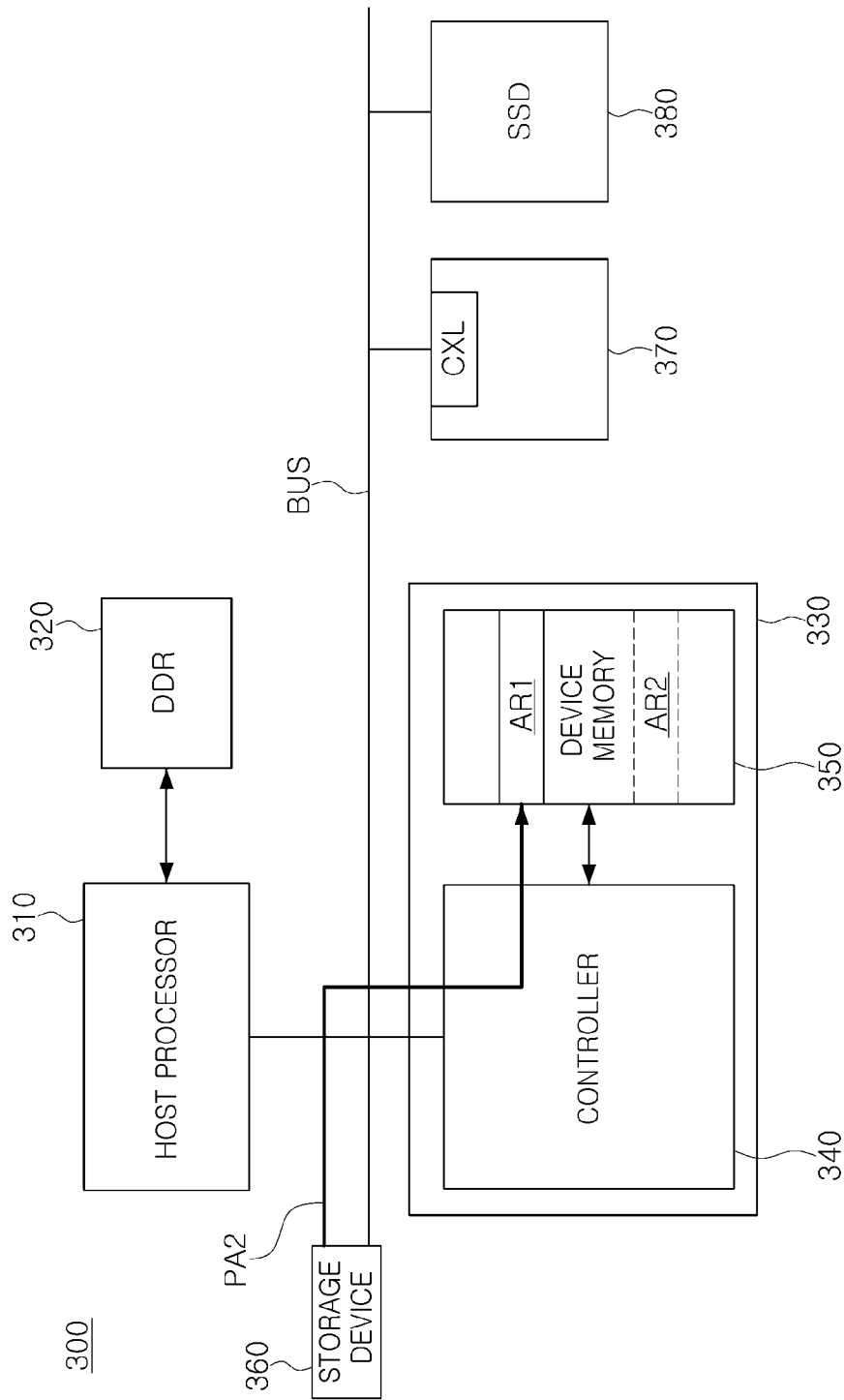

FIGS. 8 to 10 are diagrams illustrating a method of operating a system according to an example embodiment.

Referring to FIG. 8, to store data necessary for acceleration operation in a continuous position of the device memory 350, the controller 340 may move the data distributed and stored in the first memory area AR1 to the memory area AR2 (PA1). The second memory area AR2 may be a different memory area within the same device memory as the device memory including the first memory area AR1.

Referring to FIG. 9, after moving the data distributed and stored in the first memory area AR1 to the second memory area AR2 (PA1), the host processor may exclude the first memory area AR1 from the system memory map. Accordingly, the device memory area (a) may be changed to the device memory area (a-2). By excluding the first memory area AR1 from the memory map, the host processor's access to the first memory area AR1 may be limited.

Referring to FIG. 10, the controller 340 may move data required for an acceleration operation from the storage device 360 to the first memory area AR1 (PA2). The data may be stored in a continuous position of the first memory area AR1. The accelerator circuit 343 may perform an acceleration operation using the data.

Figure 11:
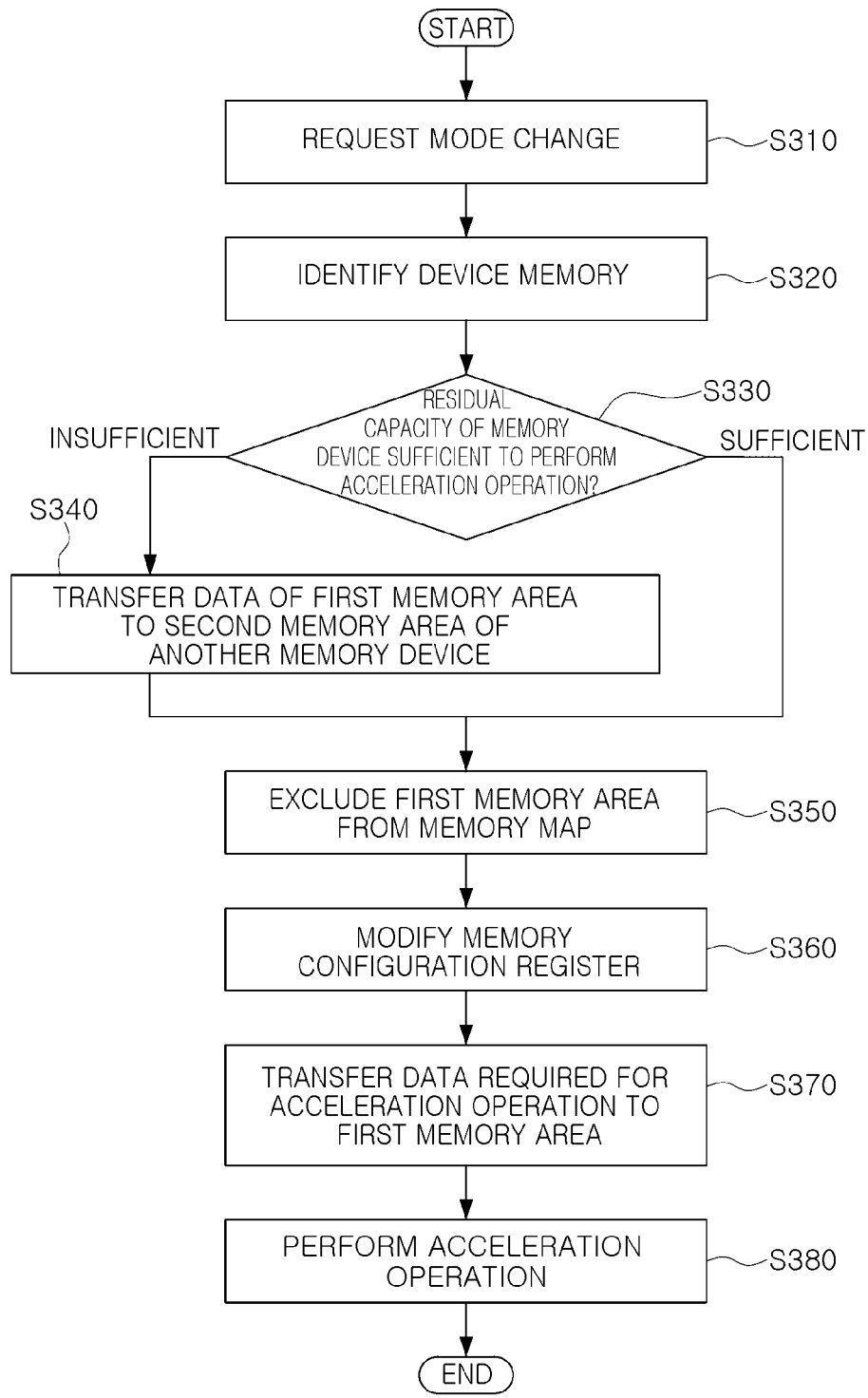
FIG. 11 is a flowchart illustrating a method of operating a system according to another example embodiment of the present disclosure.

FIG. 11 is a flowchart illustrating a method of operating a system according to another example embodiment.

Referring to FIGS. 3 and 11 together, the controller 340 may receive a mode change request for setting a portion of a memory area of the device memory 350 to be used for an accelerated operation. The controller 340 may receive information indicating the quantity of data from the operating system. The controller 340 may calculate memory capacity required to perform an acceleration operation based on the quantity of data received from the operating system.

In response to the mode change request (S310), the controller 340 may identify the memory area of the device memory 350 (S320), and may determine whether residual capacity of the device memory 350 is sufficient to perform the acceleration operation (S330).

When it is determined that the residual capacity of the memory device is sufficient (sufficient in S330), to set the first memory area of the device memory 350 as an accelerated operation area, a command for excluding the first memory area from the system memory map may be transmitted to the host processor 310. Accordingly, the first memory area may be excluded from the system memory map (S350). Also, the controller 340 may modify the memory configuration register 344 and may exclude the first memory area from the memory configuration register 344 (S360). The controller 340 may move the data required for the acceleration operation from the storage device 360 to the first memory area (S370), and the accelerator circuit 343 may perform the acceleration operation using the data (S380).

When it is determined that the residual capacity of the memory device is insufficient (insufficient in S330), to secure the first memory area of the device memory 350 as an accelerated operation area, data stored in the first memory area may be moved to the second memory area of another device (S340). The second memory area may be included in a device memory different from the device memory 350 including the first memory area. According to an example embodiment, the second memory area may be included in one of the host memory 320 and a remote memory. The remote memory may refer to a memory relatively far from the host processor 310, and may be, for example, a NAND flash-based SSD, but an example embodiment thereof is not limited thereto. The host memory 320 may be a local memory relatively close to the host processor 301. Accordingly, a space in the device memory 350 for storing data required for acceleration calculation may be secured.

The controller 340 may transmit a command to the host processor 310 to exclude the first memory area from the system memory map. Accordingly, the first memory area may be excluded from the system memory map (S350). Also, the controller 340 may modify the memory configuration register 344 and may exclude the first memory area from the memory configuration register 344 (S360). The controller 340 may move the data required for the acceleration operation from the storage device 360 to the first memory area (S370), and the accelerator circuit 343 may perform the acceleration operation using the data (S380).

Figure 12:
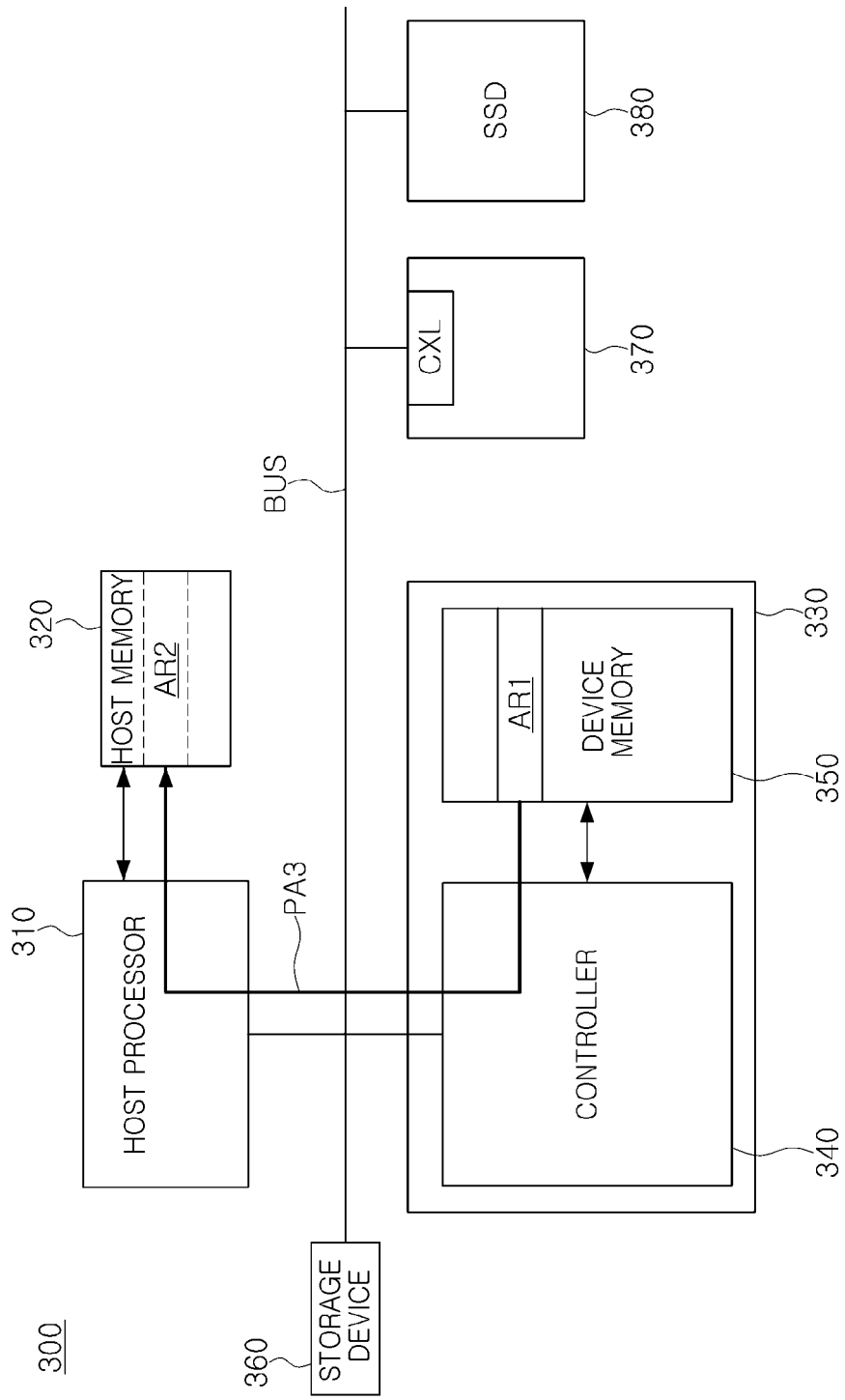
FIGS. 12 to 14 are diagrams illustrating a method of operating a system according to an example embodiment of the present disclosure.
Figure 13:
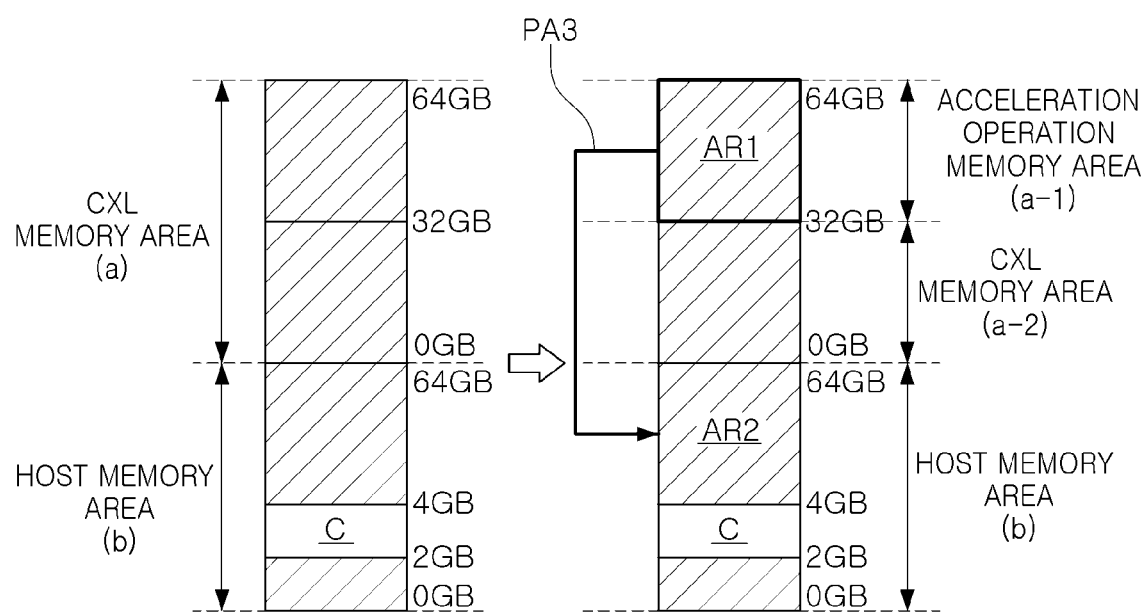
Figure 14:
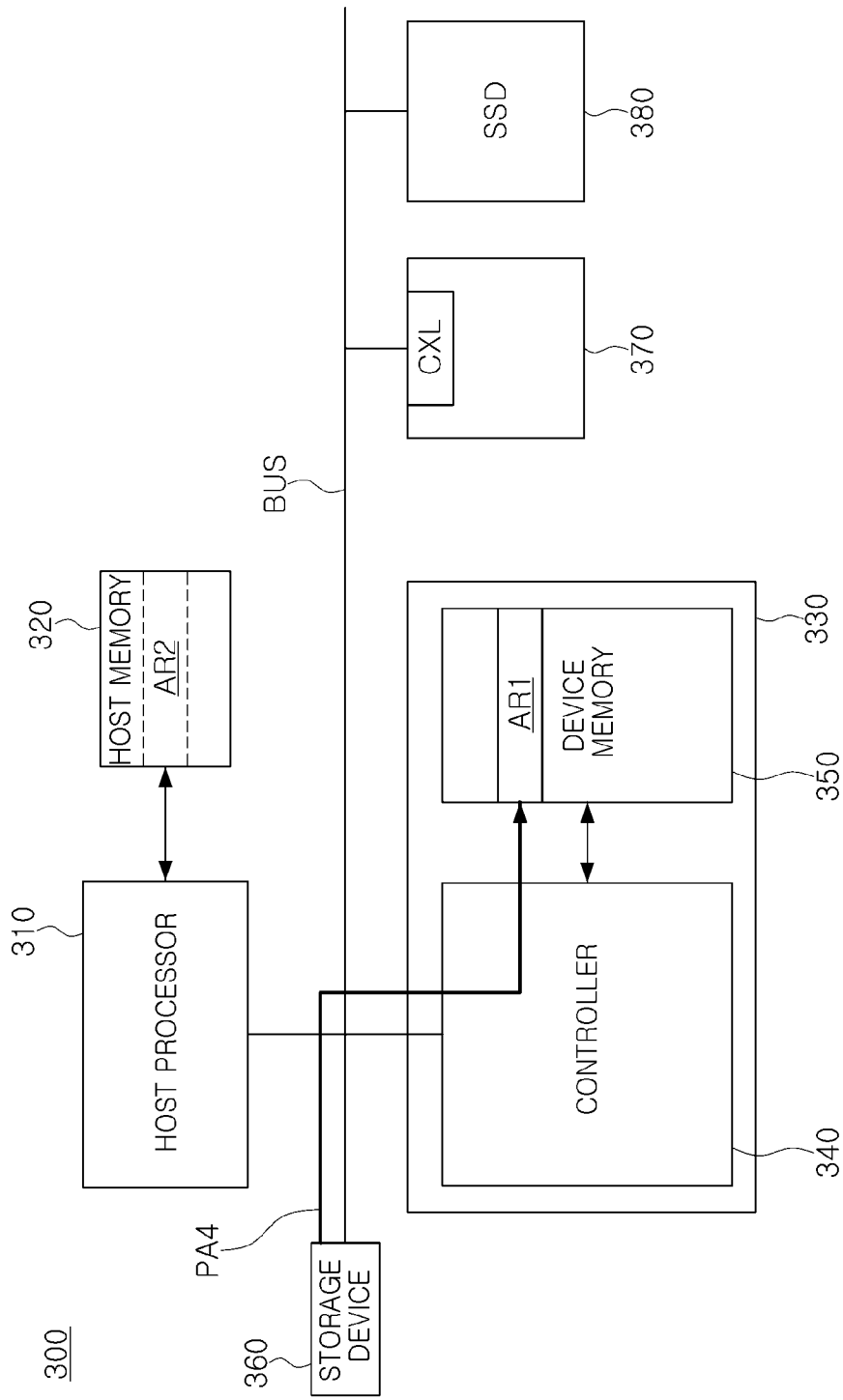

FIGS. 12 to 14 are diagrams illustrating a method of operating a system according to an example embodiment.

Referring to FIG. 12, the controller 340 may move the data in the first memory area AR1 to the second memory device in the device memory 350 to secure space for storing data required for the acceleration operation (PA3). For example, the controller 340 may move the data to the second memory area AR2 of the host memory 320.

Referring to FIG. 13, after moving the data of the first memory area AR1 to the second memory area AR2 of the host memory 320 (PA3), the host processor may exclude the first memory area AR1 from the system memory map. Accordingly, the device memory area (a) may be changed to the device memory area (a-2). By excluding the first memory area AR1 from the memory map, the host processor's access to the first memory area AR1 may be limited.

Referring to FIG. 14, the controller 340 may move data required for an acceleration operation from the storage device 360 to the first memory area AR1 (PA4). The data may be stored in the first memory area AR1. The accelerator circuit 343 may perform an acceleration operation using the data.

Figure 15:
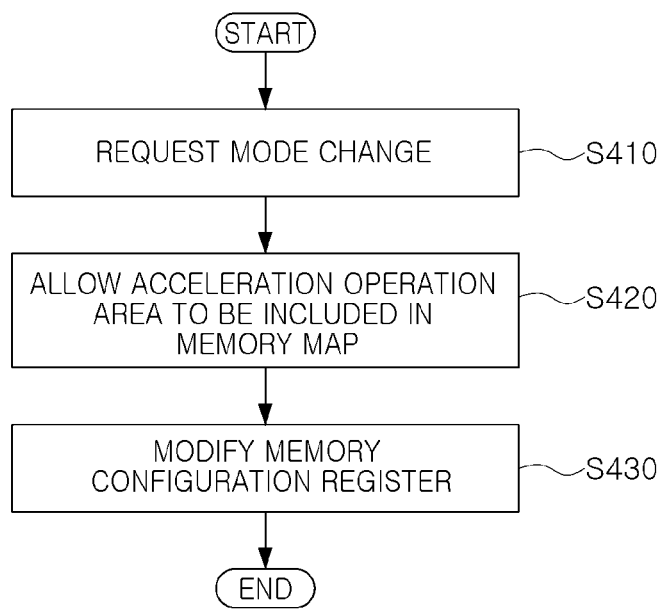
FIG. 15 is a flowchart illustrating a method of operating a system according to an example embodiment of the present disclosure.

FIG. 15 is a flowchart illustrating a method of operating a system according to an example embodiment.

Referring to FIGS. 3 and 15, after the acceleration operation is completed, in response to a mode change request to restore the memory area set as the acceleration operation area back to the system memory use (S410), the host processor 310 may allow the acceleration operation area to be included in the system memory map (S420). The controller 340 may modify the memory configuration register 344 in response to a mode change request or a command from the host processor 310, and may allow the acceleration operation area to be included in the memory configuration register 344 (S430).

Figure 16:
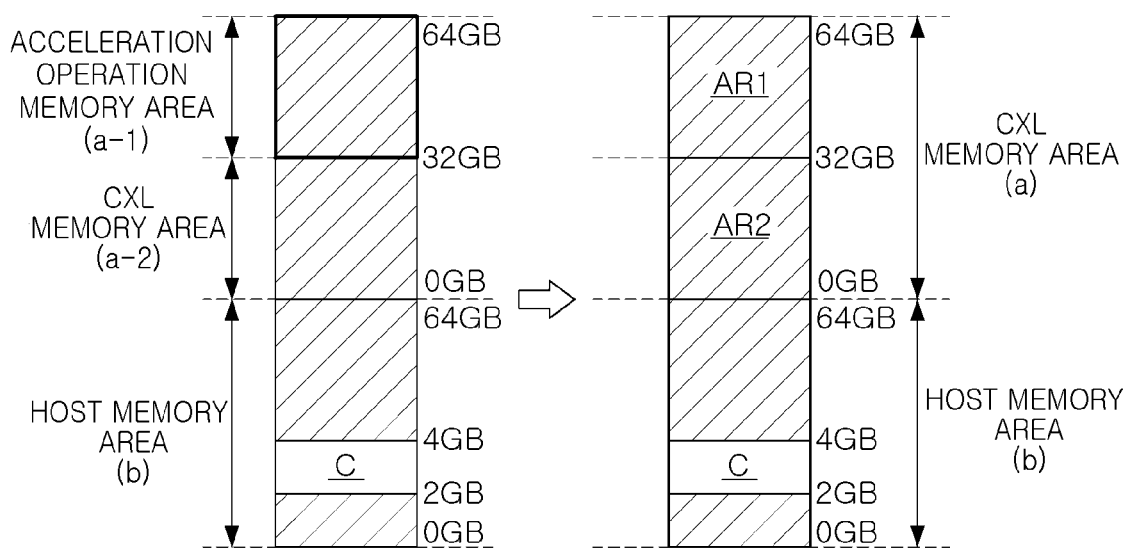
FIG. 16 is a diagram illustrating a memory map according to an example embodiment of the present disclosure.

FIG. 16 is a diagram illustrating a memory map according to another example embodiment.

Referring to FIG. 16, the host processor may allow the acceleration operation area (a-1) to be included in the system memory map. For example, the host processor may allow the accelerated operation area (a-1) to be included in the system memory map using a hot-plug function. Accordingly, the device memory area (a-2) may be changed to the device memory area (a). By allowing the acceleration calculation area (a-1) to be included in the system memory map, the host processor's access to the memory area AR1 corresponding to the acceleration calculation area (a-1) may be allowed.

Figure 17:
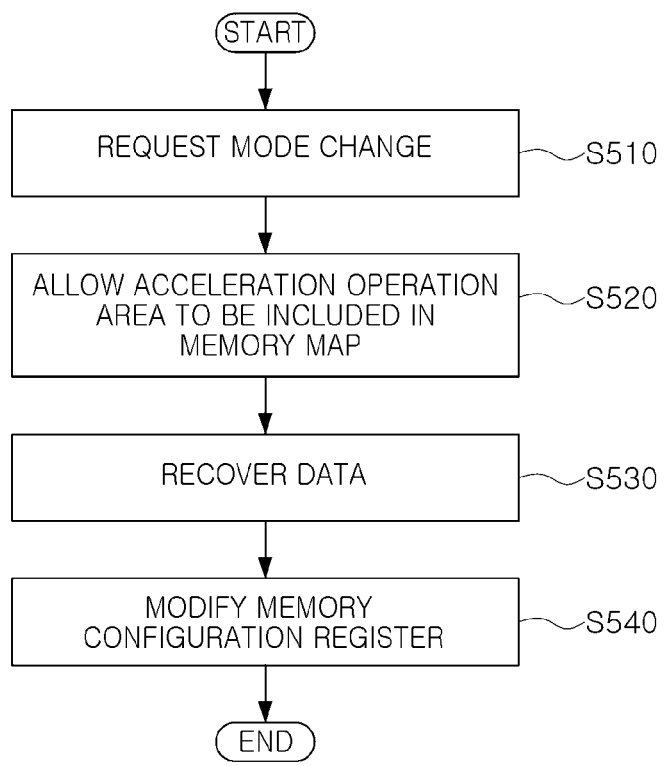
FIG. 17 is diagrams illustrating a method of operating a system according to an example embodiment of the present disclosure.

FIG. 17 is a diagram illustrating a method of operating a system according to an example embodiment.

As described above, in response to the mode change request, the controller 340 may move data distributed and stored in the first memory area AR1 to the second memory area AR2. Accordingly, the controller 340 may store data necessary for the acceleration operation in a continuous position of the device memory 350. Also, when it is determined that the residual capacity of the memory device is insufficient, the controller 340 may move the data stored in the first memory area AR1 to the second memory area AR2 of another memory device. Accordingly, the controller 340 may secure the first memory area AR1 of the device memory 350 as the acceleration operation area.

Referring to FIGS. 3 and 17, in response to a mode switch request to restore the memory area set as the acceleration operation area in the device memory 350 to be used for the system memory use (S510), the host processor 310 may allow the first memory area to be included in the system memory map (S520). The controller 340 may restore existing data stored in the second memory area to the first memory area in response to a mode change request or a command from the host processor 310 (S530). The controller 340 may allow the first memory area to be included in the memory configuration register 344 (S540).

Figure 18:
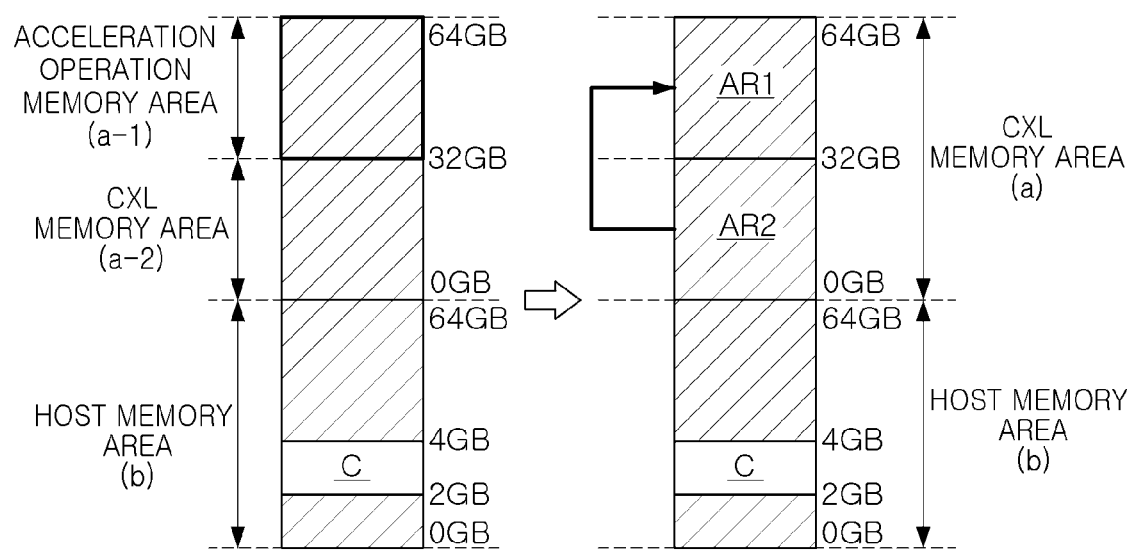
FIGS. 18 and 19 are diagrams illustrating a method of operating a system according to an example embodiment of the present disclosure.
Figure 19:
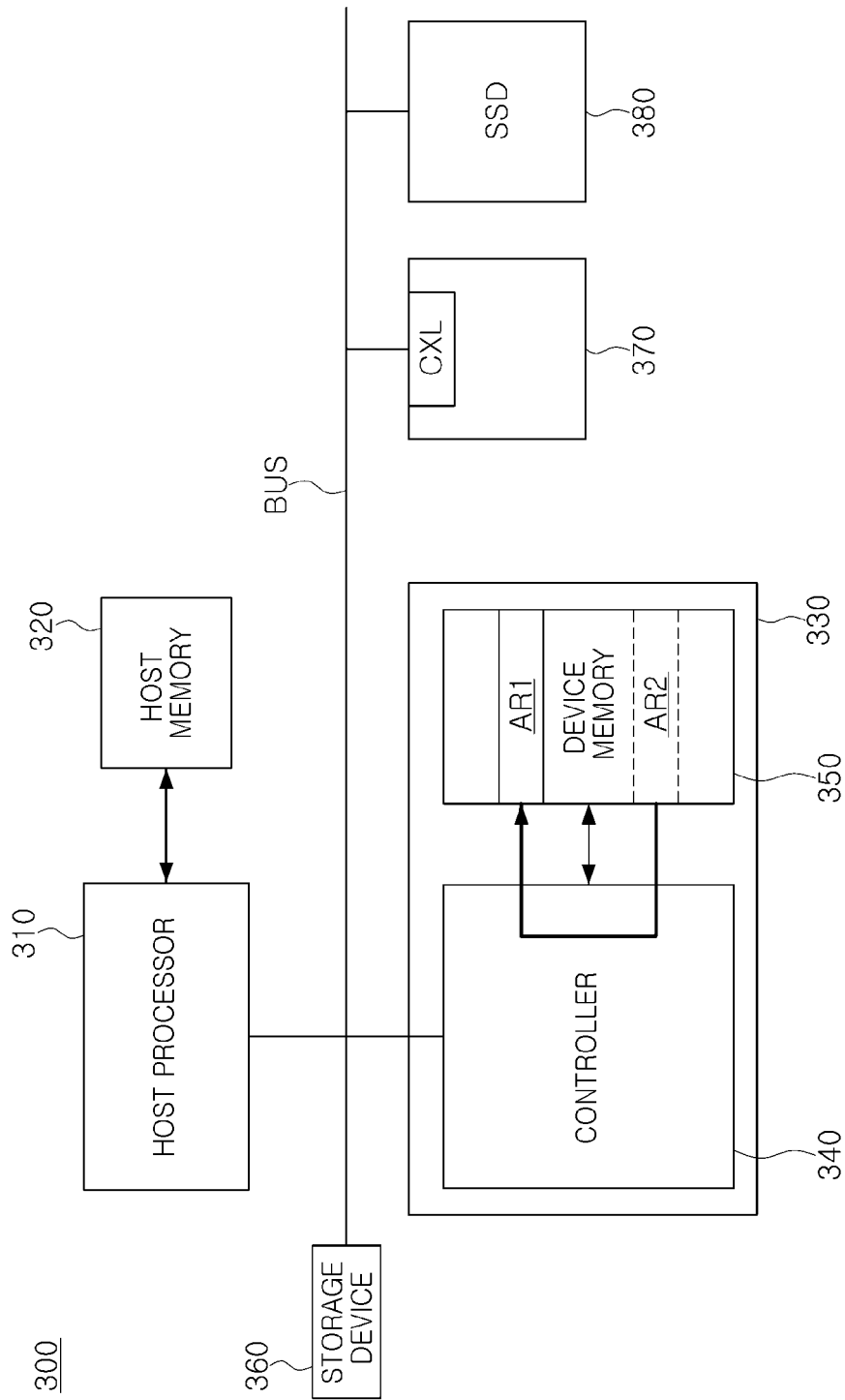

FIGS. 18 and 19 are diagrams illustrating a method of operating a system according to an example embodiment.

Referring to FIG. 18, the host processor may allow the first memory area (a-1) of the device memory to be included in the system memory map. Accordingly, the device memory area (a-2) may be changed to the device memory area (a). By including the first memory area (a-1) in the system memory map, the host processor's access to the first memory area AR1 may be allowed.

Referring to FIG. 19, after the host processor allows the first memory area AR1 to be included in the system memory map, existing data stored in the second memory area may be restored to the first memory area.

Figure 20:
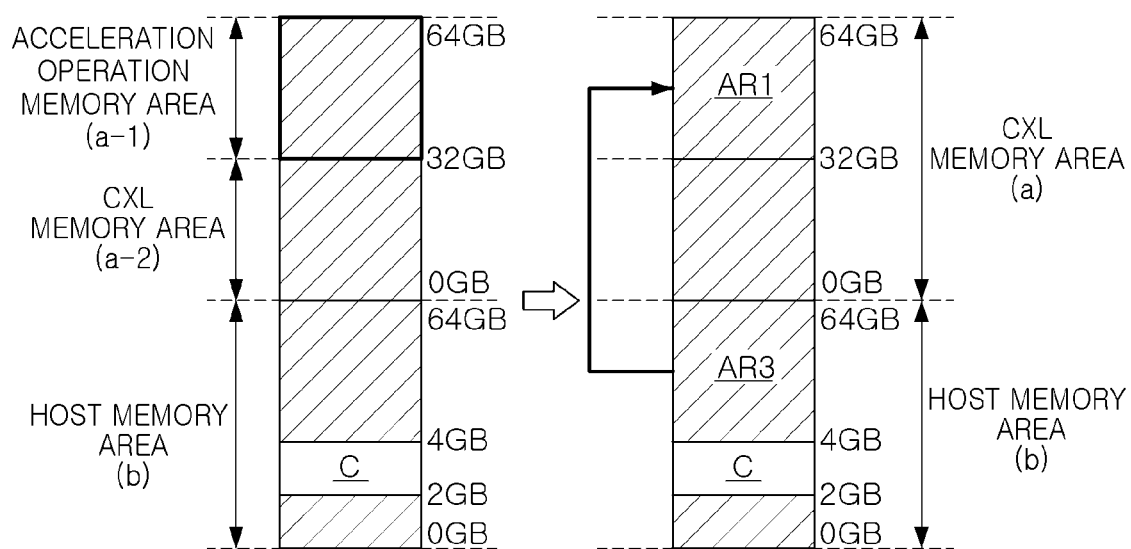
FIGS. 20 and 21 are diagrams illustrating a method of operating a system according to an example embodiment of the present disclosure.
Figure 21:
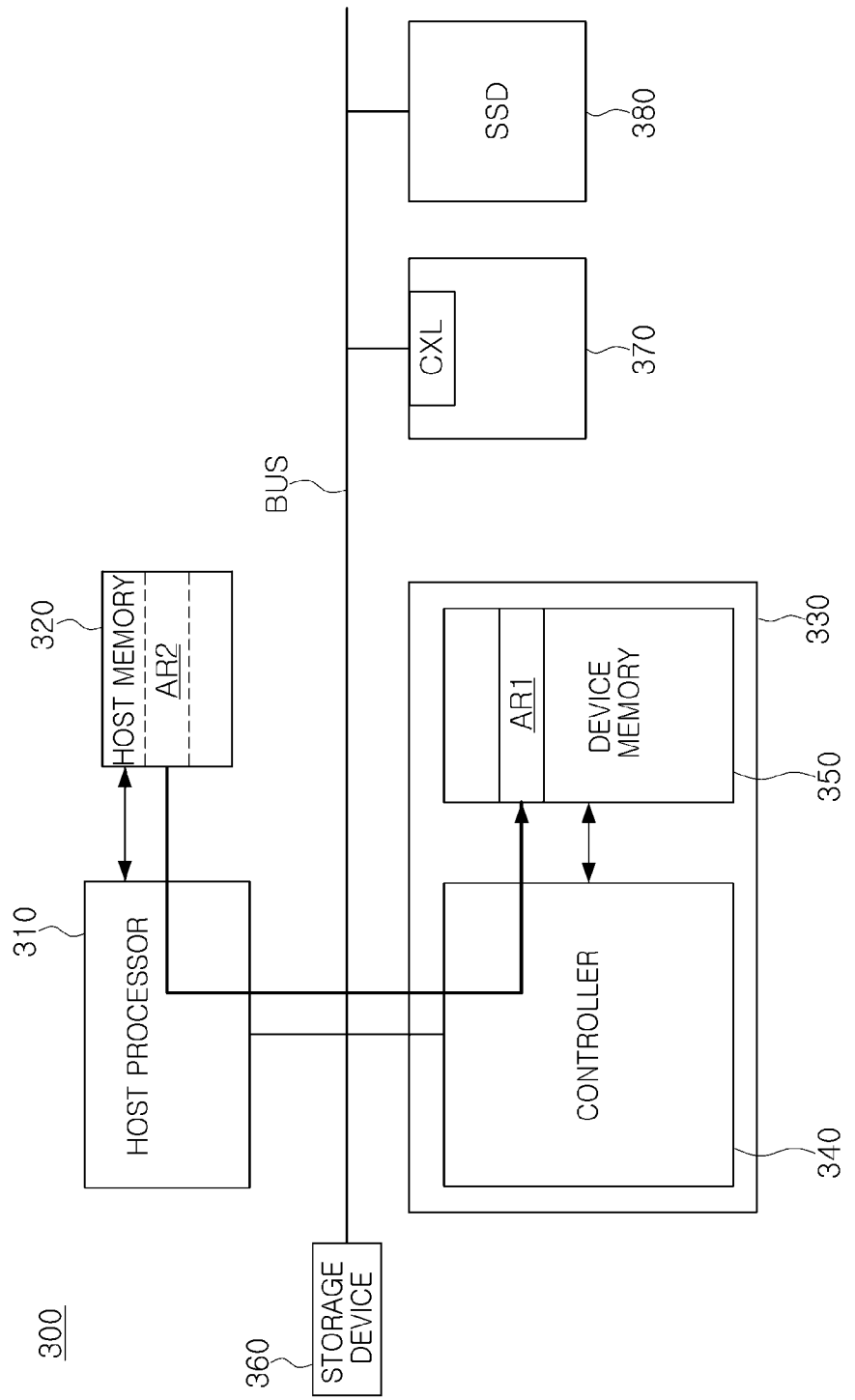

FIGS. 20 and 21 are diagrams illustrating a method of operating a system according to an example embodiment.

Referring to FIG. 20, the host processor may allow the first memory area (a-1) of the host memory to be included in the system memory map. Accordingly, the device memory area (a-2) may be changed to the device memory area (a). By including the first memory area (a-1) in the system memory map, the host processor's access to the first memory area AR1 may be allowed.

Referring to FIG. 21, after the host processor allows the first memory area AR1 to be included in the system memory map, existing data stored in the second memory area AR2 may be restored to the first memory area AR1.

Figure 22:
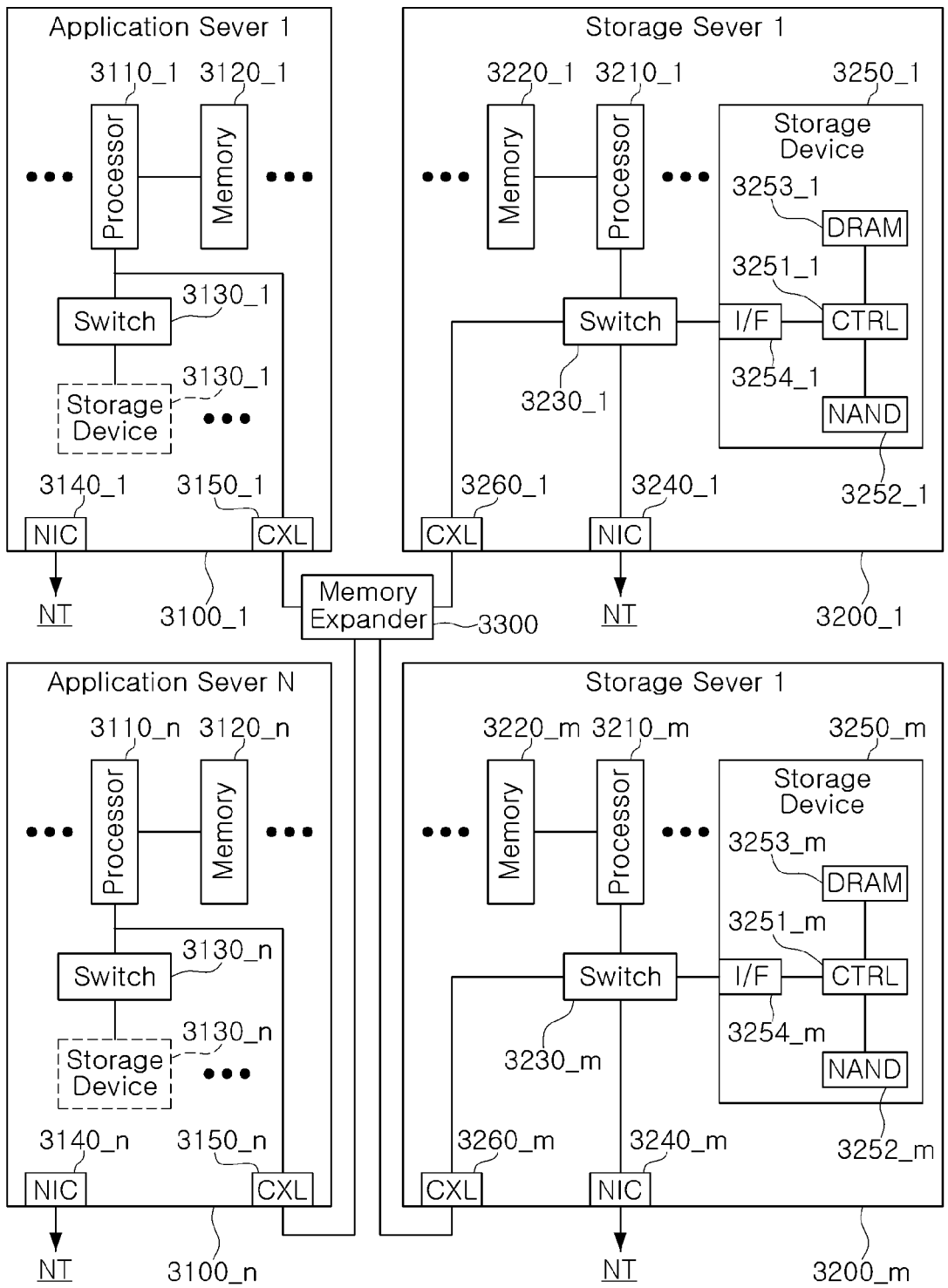
FIG. 22 is a block diagram illustrating a data center to which a server system is applied according to an example embodiment of the present disclosure.

FIG. 22 is a block diagram illustrating a data center to which a server system is applied according to an example embodiment. Referring to FIG. 22, a data center 3000 may be a facility maintaining various data and providing various services for various data, and may be referred to as a data storage center. The data center 3000 may be a system for operating a search engine or a database, and may be a computing system used in various institutions. The data center 3000 may include a plurality of application servers 3100_1 to 3100_n and a plurality of storage servers 3200_1 to 3200_m. The number of the plurality of application servers 3100_1 to 3100_n and the number of the plurality of storage servers 3200_1 to 3200_m may be varied.

Hereinafter, an example of the first storage server 3200_1 will be described. Each of the other storage servers 3200_2 to 3200_m and the plurality of application servers 3100_1 to 3100_n may have a structure similar to that of the first storage server 3200_1.

The first storage server 3200_1 may include a processor 3210_1, a memory 3220_1, a switch 3230_1, a network interface connector (NIC) 2240_1, a storage device 3250_1, and a CXL interface controller 3260_1. The processor 3210_1 may control overall operations of the first storage server 3200_1. The memory 3220_1 may store various commands or data under control of the processor 3210_1. The processor 3210_1 may be configured to access the memory 3220_1 and to execute various commands or process data. In an example embodiment, the memory 3220_1 may include at least one of various types of memory devices such as a DDR double data rate synchronous DRAM (SDRAM), High Bandwidth Memory (HBM), Hybrid Memory Cube (HMC), Dual In-line Memory Module (DIMM), OPTANE DIMM, or nonvolatile DIMM (NVDIMM).

In an example embodiment, the number of processors 3210_1 and the number of memories 3220_1 included in the first storage server 3200_1 may be varied. In an example embodiment, the processor 3210_1 and the memory 3220_1 included in the first storage server 3200_1 may be included in a processor-memory pair, and the number of the processor-memory pair included in the first storage server 3200_1 may be varied. In an example embodiment, the number of processors 3210_1 and the number of memories 3220_1 included in the first storage server 3200_1 may be different from each other. The processor 3210_1 may include a single-core processor or a multi-core processor.

The switch 3230_1 may selectively connect the processor 3210_1 to the storage device 3250_1 under control of the processor 3210_1, or may selectively connect the NIC 3240_1, the storage device 3250_1, and the CXL 3260_1 to each other.

The NIC 3240_1 may be configured to connect the first storage server 3200_1 to the network NT. The NIC 3240_1 may include a network interface card, a network adapter, and the like. The NIC 3240_1 may be connected to the network NT by a wired interface, a wireless interface, a Bluetooth interface, an optical interface, or the like. The NIC 3240_1 may include an internal memory, a DSP, a host bus interface, and the like, and may be connected to the processor 3210_1 or the switch 3230_1 through the host bus interface. The host bus interface may include at least one of various interfaces such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), Universal Flash Storage (UFS), embedded Universal Flash Storage (eUFS), compact flash (CF) card interface, and the like. In an example embodiment, the NIC 3240_1 may be integrated with at least one of the processor 3210_1, the switch 3230_1, and the storage device 3250_1.

The storage device 3250_1 may store data or may output stored data under control of the processor 3210_1. The storage device 3250_1 may include a controller 3251_1, a nonvolatile memory 3252_1, a DRAM 3253_1, and an interface 3254_1. In an example embodiment, the storage device 3250_1 may further include a secure element (SE) for security or privacy.

The controller 3251_1 may control general operations of the storage device 3250_1. In an example embodiment, the controller 3251_1 may include an SRAM. The controller 3251_1 may store data in the nonvolatile memory 3252_1 or may output data stored in the nonvolatile memory 3252_1 in response to signals received through the interface 3254_1. In an example embodiment, the controller 3251_1 may be configured to control the nonvolatile memory 3252_1 based on a toggle interface or an ONFI interface.

The DRAM 3253_1 may be configured to temporarily store data to be stored in the nonvolatile memory 3252_1 or data read from the nonvolatile memory 3252_1. The DRAM 3253_1 may be configured to store various data (e.g., metadata, mapping data, or the like) required for the controller 3251_1 to operate. The interface 3254_1 may provide a physical connection between the processor 3210_1, the switch 3230_1, or the NIC 3240_1 and the controller 3251_1. In an example embodiment, the interface 3254_1 may be implemented in a direct attached storage (DAS) method for directly connecting the storage device 3250_1 to a dedicated cable. In an example embodiment, the interface 3254_1 may be configured based on at least one of the various interfaces described above through the host interface bus.

The configurations of the first storage server 3200_1 described above may be an example, and an example embodiment thereof is not limited thereto. The configurations of the first storage server 3200_1 described above may be applied to other storage servers or each of a plurality of application servers. In an example embodiment, in each of the plurality of application servers 3100_1 to 3100_n, the storage device 3130_1 may be selectively omitted.

The plurality of application servers 3100_1 to 3100_n and the plurality of storage servers 3200_1 to 3200_m may communicate with each other through the network NT via 3140_1 to 3140_n and 3240_1 to 3240_n. The network NT may be implemented using a fiber channel (FC) or Ethernet. In this case, the FC may be a medium used for relatively high-speed data transmission, and may use an optical switch providing high performance/high availability may be used. Depending on the access method of the network NT, the storage servers 3200_1 to 3200_m may be provided as file storage, block storage, or object storage.

In an example embodiment, the network NT may be a storage dedicated network, such as a storage area network (SAN). For example, the SAN may be an FC-SAN using an FC network and implemented according to FC Protocol (FCP). Alternatively, the SAN may be an IP-SAN using a TCP/IP network and implemented according to an iSCSI (SCSI over TCP/IP or Internet SCSI) protocol. In an example embodiment, the network NT may be a general network such as a TCP/IP network. For example, the network NT may be implemented according to protocols such as FC over Ethernet (FCoE), network attached storage (NAS), and NVMe over Fabrics (NVMe-oF).

In an example embodiment, at least one of the plurality of application servers 3100_1 to 3100_n may be configured to access at least the other of the plurality of application servers 3100_1 to 3100_n or at least one of the plurality of storage servers 3200_1 to 3200_m through the network NT.

For example, the first application server 3100_1 may store data requested by a user or a client in at least one of the plurality of storage servers 3200_1 to 3200_m through the network NT. Alternatively, the first application server 3100_1 may obtain data requested by a user or a client from at least one of the plurality of storage servers 3200_1 to 3200_m through the network NT. In this case, the first application server 3100_1 may be implemented as a web server or DBMS (Database Management System).

That is, the processor 3110_1 of the first application server 3100_1 may access the memory 3120_n or the storage device 3130_n of another application server (e.g., 3100_n) through the network NT. Alternatively, the processor 3110_1 of the first application server 3100_1 may access the memory 3220_1 or the storage device 3250_1 of the first storage server 3200_1 through the network NT. Through this, the first application server 3100_1 may perform various operations on data stored in the other application servers 3100_2 to 3100_n or the plurality of storage servers 3200_1 to 3200_m. For example, the first application server 3100_1 may execute or issue a command for moving or copying data between other application servers 3100_2 to 3100_n or a plurality of storage servers 3200_1 to 3200_m. In this case, the moved or copied data may be moved from the storage devices 3250_1 to 3250_m of the storage servers 3200_1 to 3200_m to the memories 3220_1 to 3220_m of the storage servers 3200_1 to 3200_m or may be directly moved to the memories 3120_1 to 3120_n of the application servers 3100_1 to 3100_n. Data transmitted over the network NT may be encrypted data for security or privacy.

In an example embodiment, the plurality of storage servers 3200_1 to 3200_m and the plurality of application servers 3100_1 to 3100_n may be connected to the memory expander 3300 through a CXL interface (3260_1 to 3260_m and 3150_1 to 3150_n). The memory expander 3300 may be used as an extended memory for each of the plurality of storage servers 3200_1 to 3200_m and the plurality of application servers 3100_1 to 3100_n. Each of the plurality of storage servers 3200_1 to 3200_m and the plurality of application servers 3100_1 to 3100_n may communicate through the CXL interface and the memory expander 3300 based on the method described with reference to FIGS. 1 to 21.

Figure 23:
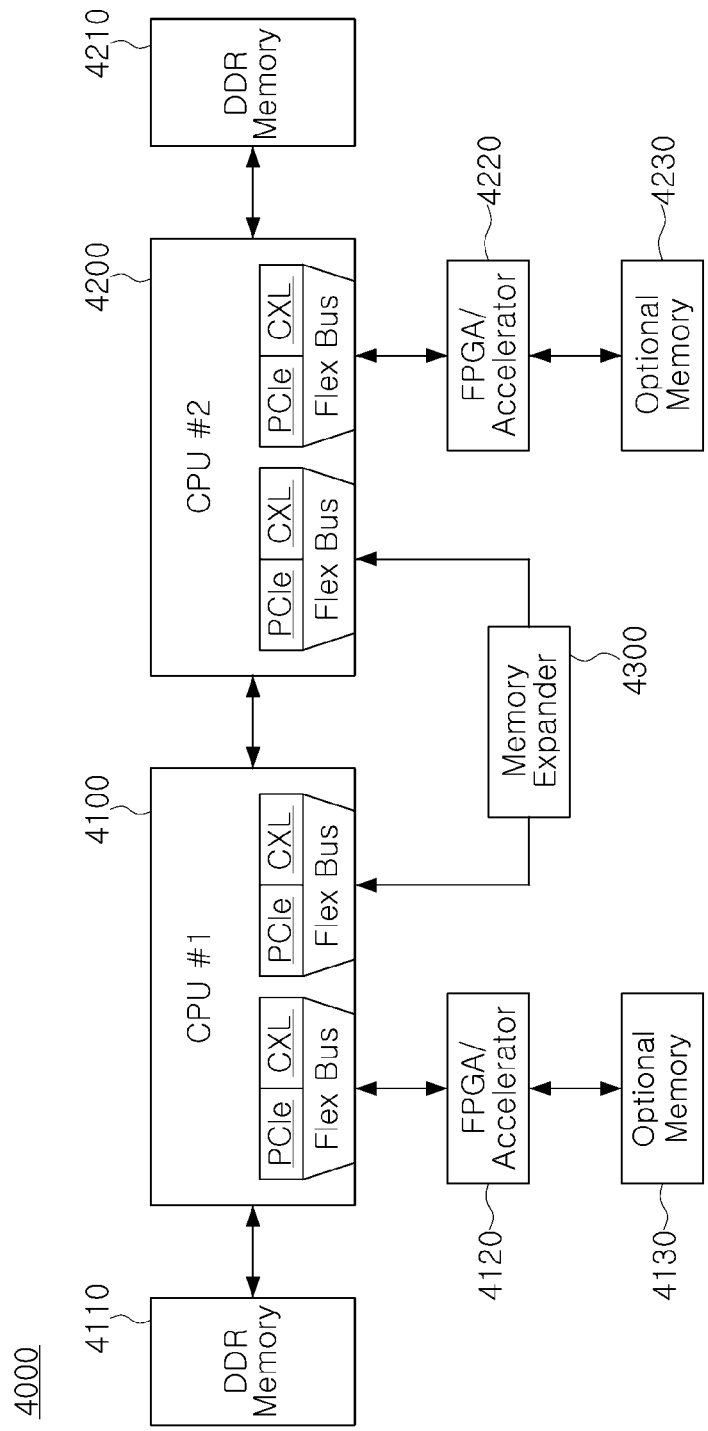
FIG. 23 is a diagram illustrating a heterogeneous computing interface according to an example embodiment of the present disclosure.

FIG. 23 is a diagram illustrating a heterogeneous computing interface according to an example embodiment. Referring to FIG. 23, an example embodiment of a heterogeneous computing interface connected to a memory expander in an example embodiment may be described based on a CXL interface, but an example embodiment thereof is not limited thereto, and the heterogeneous computing interface may be implemented based on at least one of various computing interfaces such as Gen-Z protocol, NVLink protocol, CCIX protocol, Open CAPI protocol, and the like.

Referring to FIG. 23, the heterogeneous computing system 4000 may include a plurality of CPUs 4100 and 4200, a plurality of memories 4110 and 4210, accelerators 4120 and 4220, additional memories 4130 and 4230, and a memory expander 4300. Each of the plurality of CPUs 4100 and 4200 may be a processor configured to process various operations. The plurality of CPUs 4100 and 4200 may communicate with each other through a separate link. In an example embodiment, the separate link may include a CPU-to-CPU coherent link.

A plurality of CPUs 4100 and 4200 may communicate with a plurality of memories 4110 and 4210, respectively. For example, the first CPU 4100 may directly communicate with the first memory 4110, and the second CPU 4200 may directly communicate with the second memory 4210. The first and second memories 4110 and 4210 may be DDR memories. In an example embodiment, the virtual memory allocated to the virtual machines in the example embodiment may be memory allocated from the DDR memories 4110 and 4210.

A plurality of CPUs 4100 and 4200 may communicate with the accelerators 4120 and 4220 via a flex bus. The accelerators 4120 and 4220 may be integrated circuits or processors performing operations independently of the plurality of CPUs 4100 and 4200. The accelerators 4120 and 4220 may operate under control of the corresponding CPUs 4100 and 4200. The accelerators 4120 and 4220 may be connected to the additional memories 4130 and 4230, respectively. In an example embodiment, the plurality of CPUs 4100, 4200 may be configured to access the additional memories 4130, 4230 via a flex bus and the accelerators 4120 and 4220.

The plurality of CPUs 4100 and 4200 may communicate with the memory expander 4300 via a flex bus. The plurality of CPUs 4100 and 4200 may use the memory space of the memory expander 4300.

In an example embodiment, the flex bus may be a bus or port configured to select a PCIe protocol or a CXL protocol. That is, the flex bus may be configured to select the PCIe protocol or the CXL protocol according to characteristics or a communication type of the connected device. In an example embodiment, the memory expander 4300 may operate similarly to the memory module described with reference to FIGS. 1 to 21, and may communicate with the plurality of CPUs 4100 and 4200 based on the CXL protocol.

In an example embodiment, in FIG. 23, the communication structure through a flex bus is divided between the components, but an example embodiment thereof is not limited thereto. The CXL communication between the various components illustrated in FIG. 23 may be performed through the same bus or the same link.

According to the aforementioned example embodiments, since a portion of the memory area used for the system memory may be variably changed to be used exclusively for the accelerated operation, efficiency of the system may increase at low cost.

Also, since the memory module only needs to perform an acceleration operation and to transmit a result value to the host processor, a bandwidth of the host processor may be secured.

While the example embodiments have been illustrated and described above, it will be apparent to those skilled in the art that modifications and variations could be made without departing from the scope of the present disclosure as defined by the appended claims.

What is claimed is:

1. A memory module, comprising:
a device memory configured to store data, the device memory including a first memory area and a second memory area; and
a controller including an accelerator circuit,
wherein the controller is configured to
control the device memory,
transmit a command to exclude the first memory area from a system memory map to a host processor, in response to a mode change request, and
modify a memory configuration register to exclude the first memory area from the memory configuration register,
wherein the accelerator circuit is configured to use the first memory area to perform an acceleration operation,
wherein the mode change request includes an application program switching from a user mode to a kernel mode, and
wherein a unit of the first memory area is defined as a channel including a plurality of sub-channels, and
wherein at least one delay device is disposed between the sub-channels.

2. The memory module of claim 1, wherein the first memory area is excluded from the system memory map by hot-plugging out the first memory area.

3. The memory module of claim 1, wherein the controller includes the memory configuration register, which includes at least one memory address identifying the first memory area.

4. The memory module of claim 3, wherein the controller stores data necessary for the acceleration operation in the first memory area, and performs the acceleration operation using the data.

5. The memory module of claim 1, wherein the first memory area is changed from being used for a system memory to be used exclusively for an acceleration operation, and the second memory area is used for a system memory.

6. A system, comprising:
a first memory including a first memory area and a second memory area different from the first memory area;
a controller configured to directly communicate with the first memory;
a second memory; and
a processor configured to directly communicate with the second memory and communicate with the controller through a heterogeneous computing interface,
wherein the first memory is configured to operate as a system memory in which the controller and the processor are each configured to store data in each of the first memory area and the second memory area, and configured to operate as a dedicated memory in which only the controller is configured to store data to each of the first memory area and the second memory area,
wherein the first memory operates as dedicated memory in response to the processor excluding the first memory area of the first memory from a system memory map, and the controller excluding the first memory area from a memory configuration register, and
wherein when the first memory operates as dedicated memory, the first memory area is used exclusively for an acceleration operation executed by the controller.

7. The system of claim 6, wherein the controller is configured to move data stored in the first memory area to the second memory area.

8. The system of claim 7, wherein the controller is configured to determine whether residual capacity of the first memory area is sufficient to perform the acceleration operation, and when it is determined that the residual capacity of the first memory area is insufficient, the controller is configured to move the data stored in the first memory area to the second memory area.

9. The system of claim 7, wherein, after the data stored in the first memory area moves to the second memory area, the processor is configured to exclude the first memory area from the system memory map in response to a request from the controller.

10. The system of claim 7, wherein the controller includes the memory configuration register, which includes at least one memory address identifying the first memory area.

11. The system of claim 6, wherein the controller and the processor communicate with each other through a COMPUTE EXPRESS LINK (CXL) interface.

12. The system of claim 6, wherein the controller and the first memory communicate with each other through a dual data rate (DDR) interface.

13. A method of operating a memory module, the method comprising:
receiving, by a controller, a first mode change request for changing an operation mode of a first memory from a system memory in which the controller and a processor are each configured to store data in each of a first memory area and a second memory area included in the first memory, to a dedicated memory in which only the controller is configured to store data to each of the first memory area and the second memory area;
transmitting, by the controller, a command to exclude the first memory area from a system memory map, in response to the first mode change request; and
modifying, by the controller, a memory configuration register to exclude the first memory area from the memory configuration register,
wherein when the first memory operates as dedicated memory, the first memory area is used exclusively for an acceleration operation executed by the controller.

14. The method of claim 13, further comprising:
storing, by the controller, data necessary for the acceleration operation in the first memory area; and
performing, by the controller, an acceleration operation using the data.

15. The method of claim 14, further comprising:
receiving, by the controller, a second mode change request for changing the operation mode of the first memory back to system memory after the acceleration operation is completed; and
modifying, by the controller, the memory configuration register to include the first memory area when the first memory area is included in the system memory map in response to the second mode change request.

16. The system of claim 6, wherein the controller and the first memory are colocated on a memory module and the system memory map is stored external to the memory module.

17. The system of claim 6, wherein the controller is configured to adjust a size of the first memory area in response to a calculated memory capacity required to perform the acceleration operation.

18. The method of claim 13, wherein the controller and the first memory are colocated on the memory module and the system memory map is stored external to the memory module.

19. The method of claim 13, further comprising:
adjusting, by the controller, a size of the first memory area in response to a calculated memory capacity required to perform the acceleration operation.

* * * * *